Sept. 6, 1932.  H. J. WHITE  1,876,372
COMPLETELY AUTOMATIC GEAR CUTTING MACHINE
Filed Sept. 28, 1929  20 Sheets-Sheet 1

INVENTOR
*Herbert J. White*
BY
*B. V. Schlesinger*
ATTORNEY

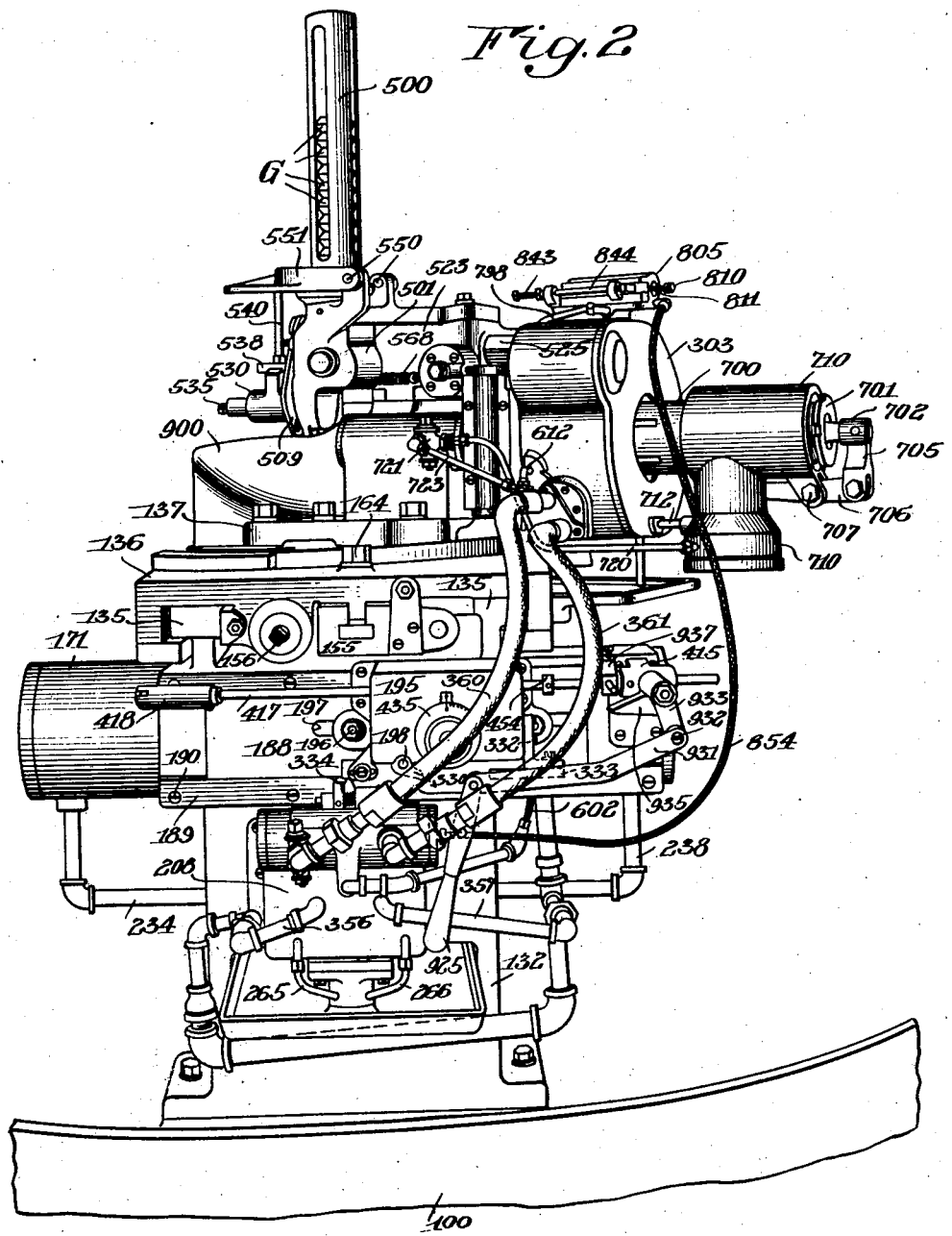

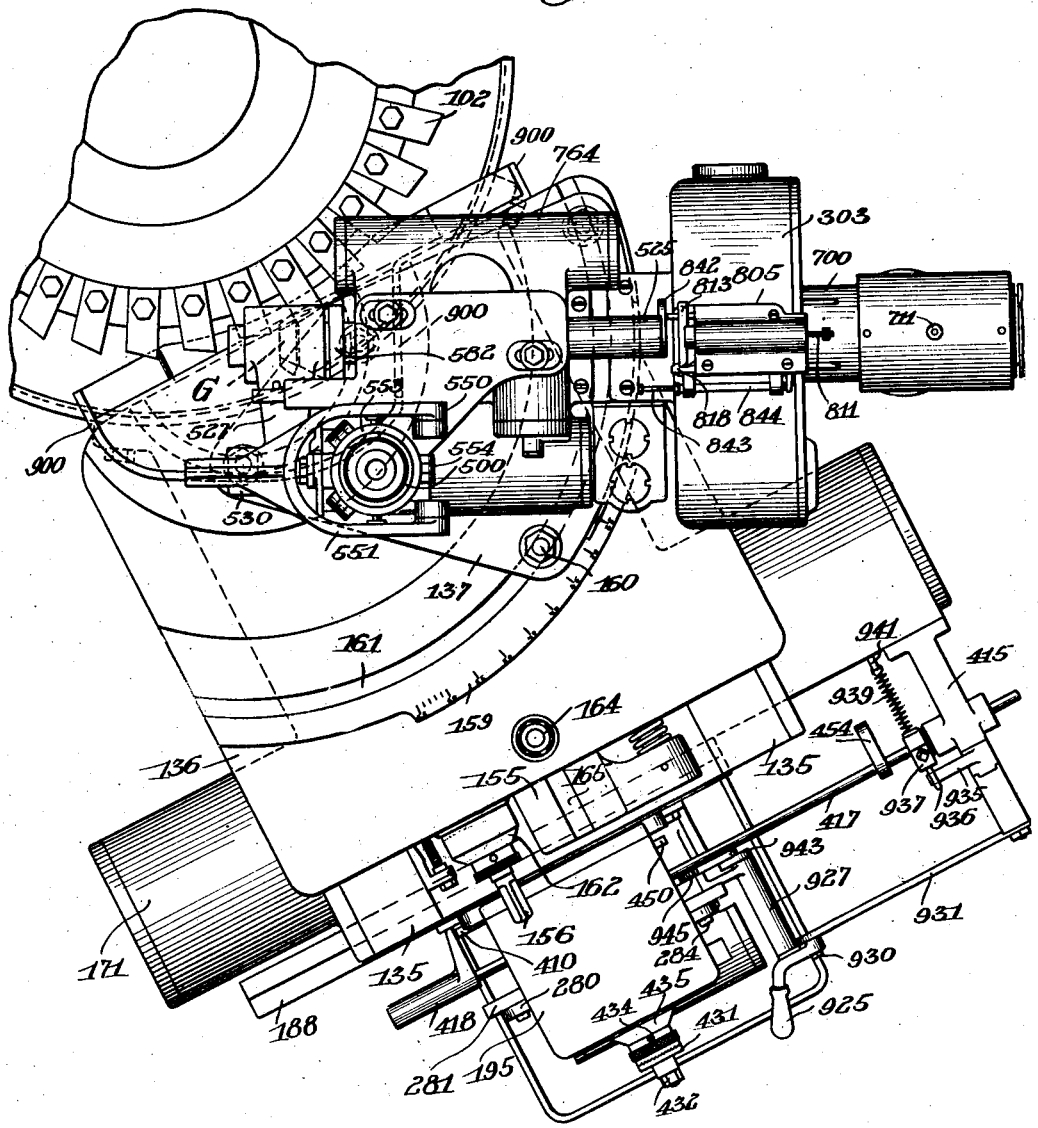

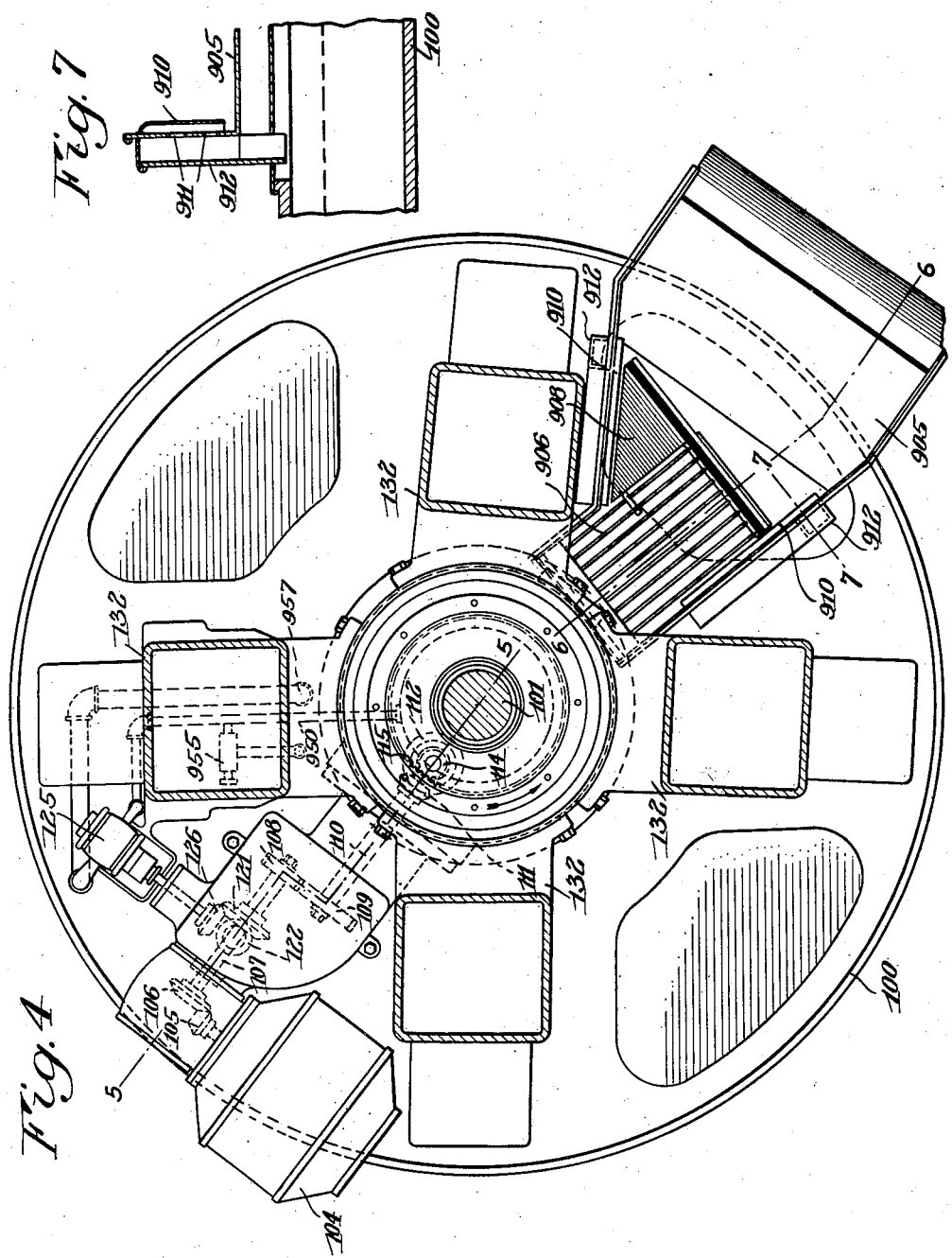

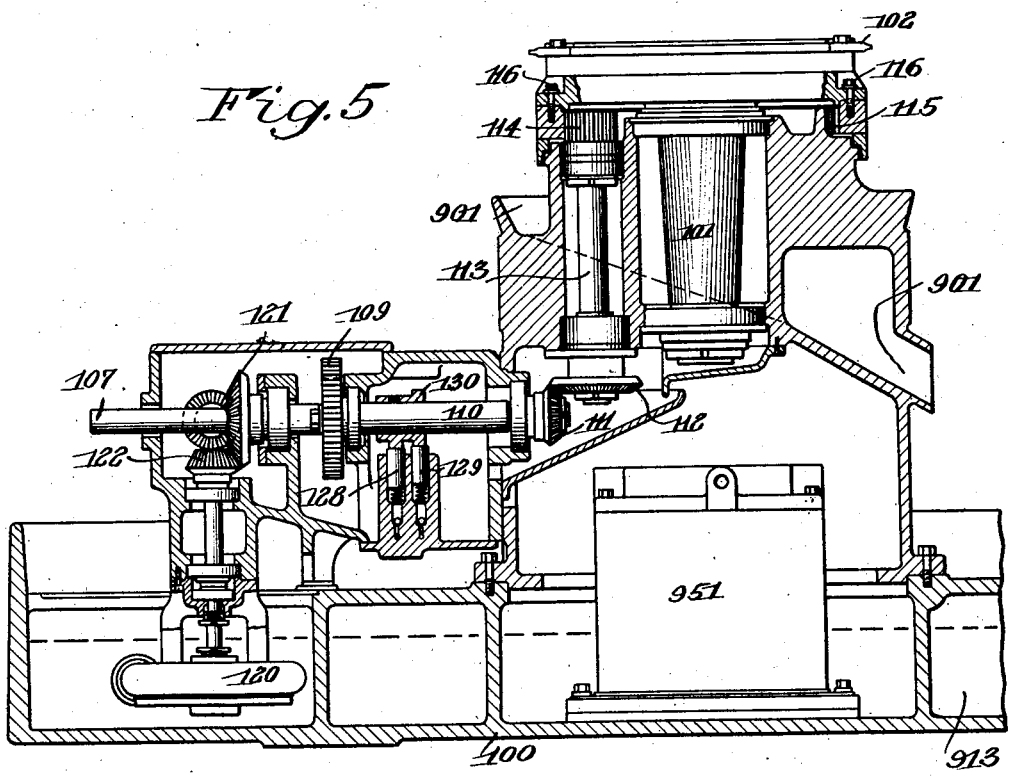
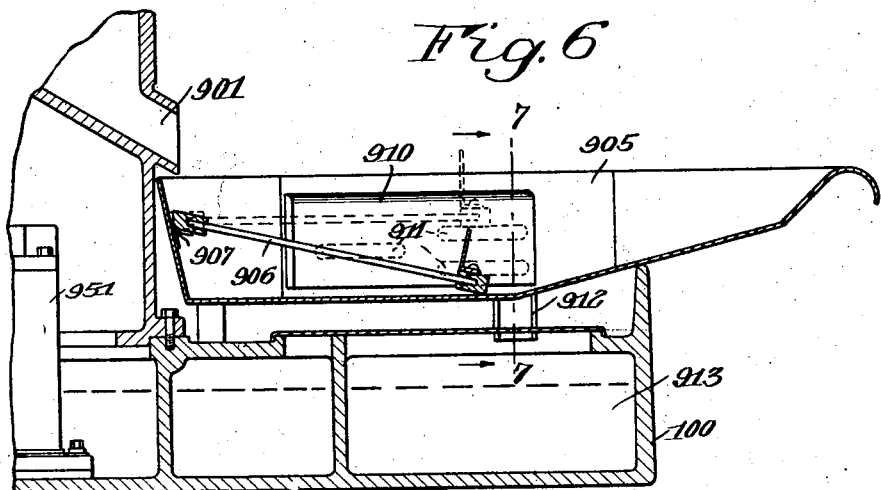

Sept. 6, 1932.  H. J. WHITE  1,876,372
COMPLETELY AUTOMATIC GEAR CUTTING MACHINE
Filed Sept. 28, 1929   20 Sheets-Sheet 6
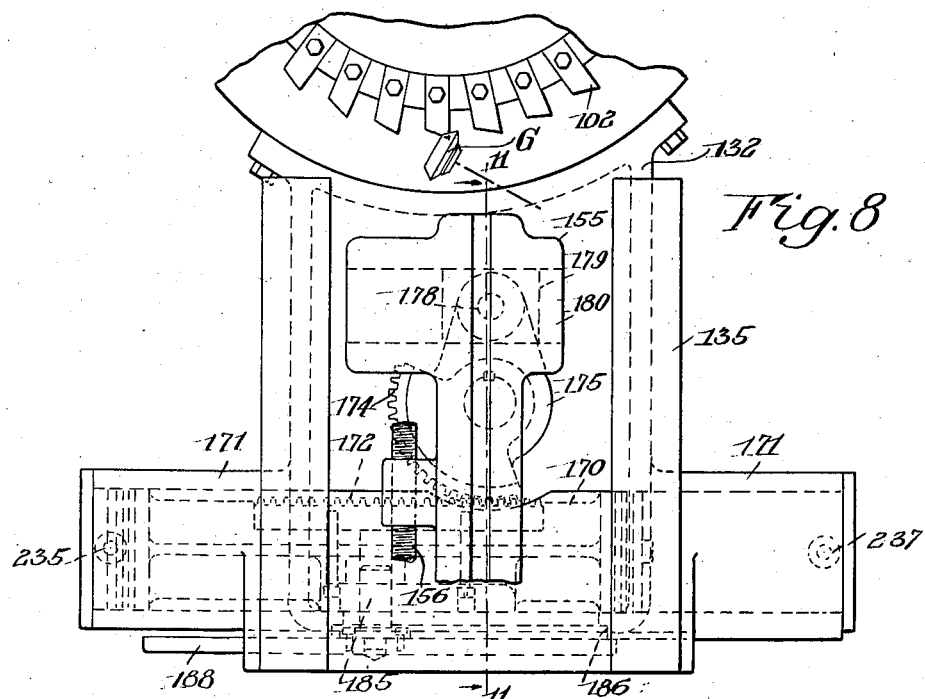
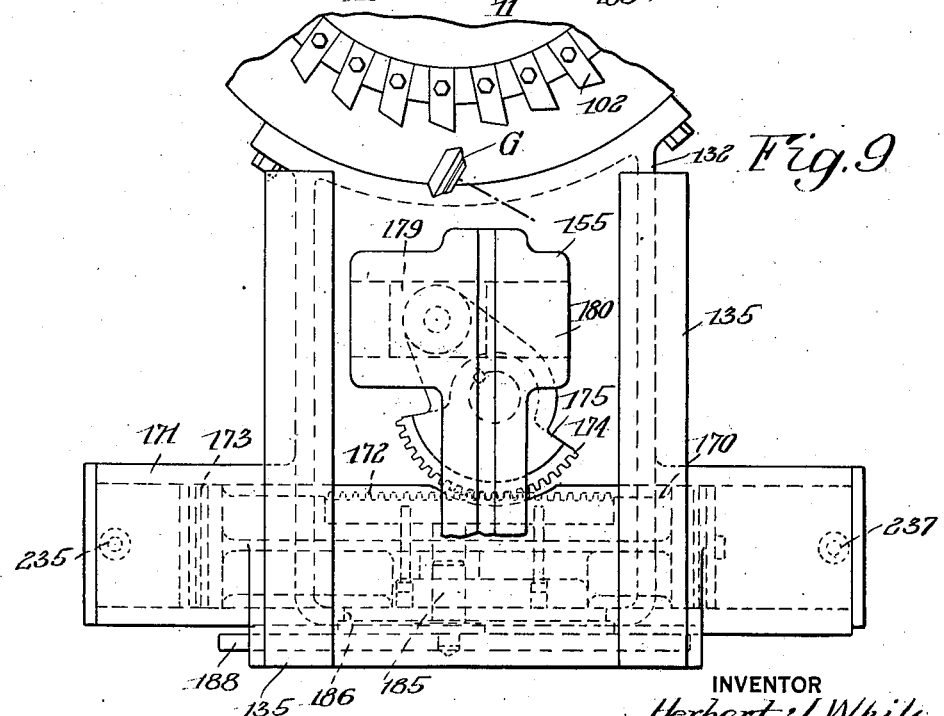
INVENTOR
Herbert J. White
BY
ATTORNEY

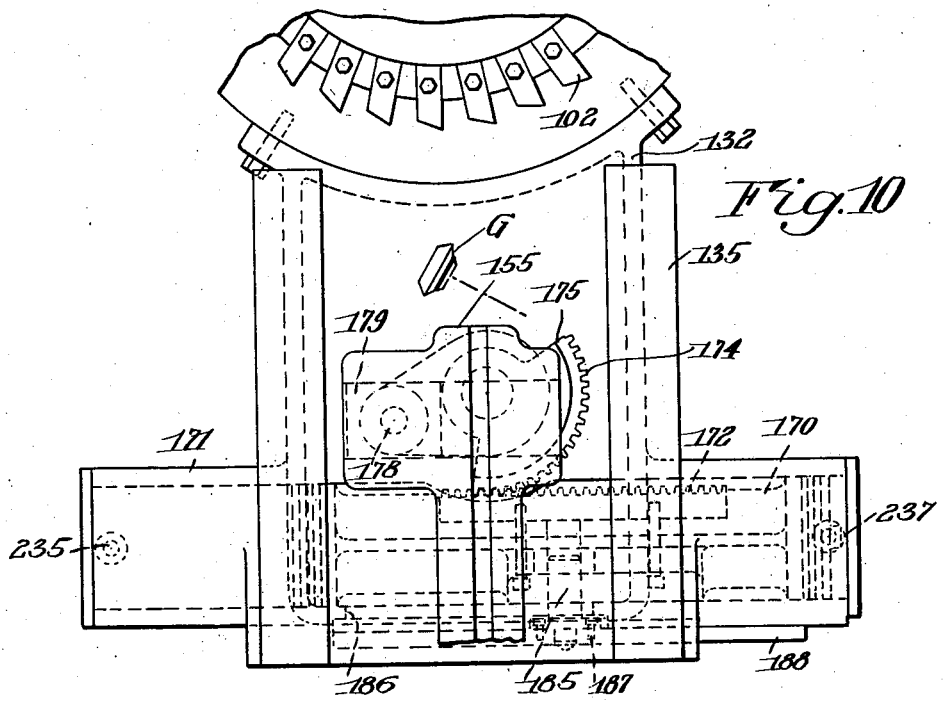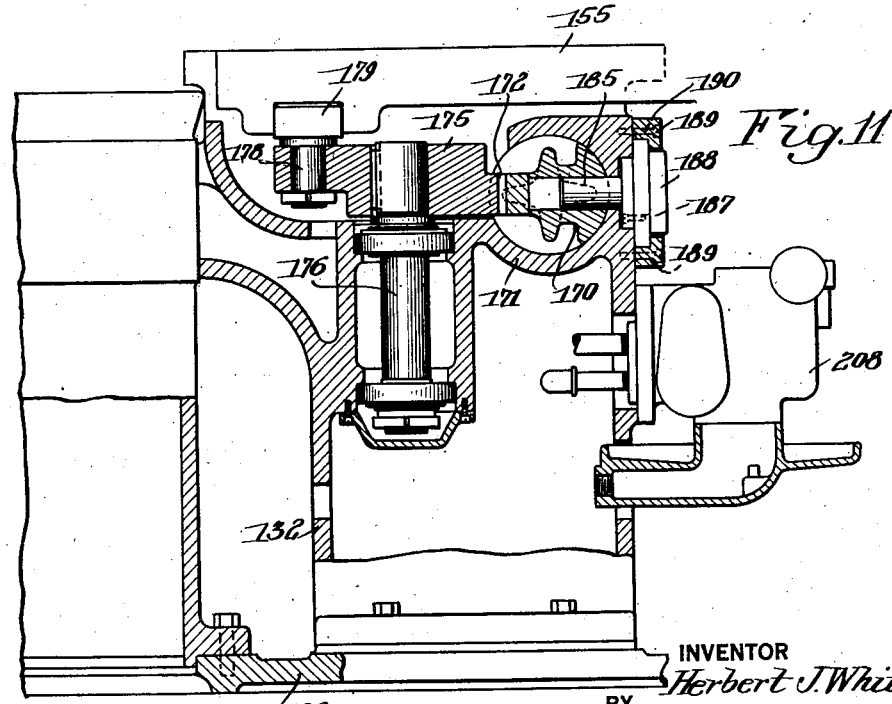

INVENTOR
Herbert J. White
BY
Schlesinger
ATTORNEY

Sept. 6, 1932.   H. J. WHITE   1,876,372
COMPLETELY AUTOMATIC GEAR CUTTING MACHINE
Filed Sept. 28, 1929   20 Sheets-Sheet 9

INVENTOR
Herbert J. White
BY
ATTORNEY

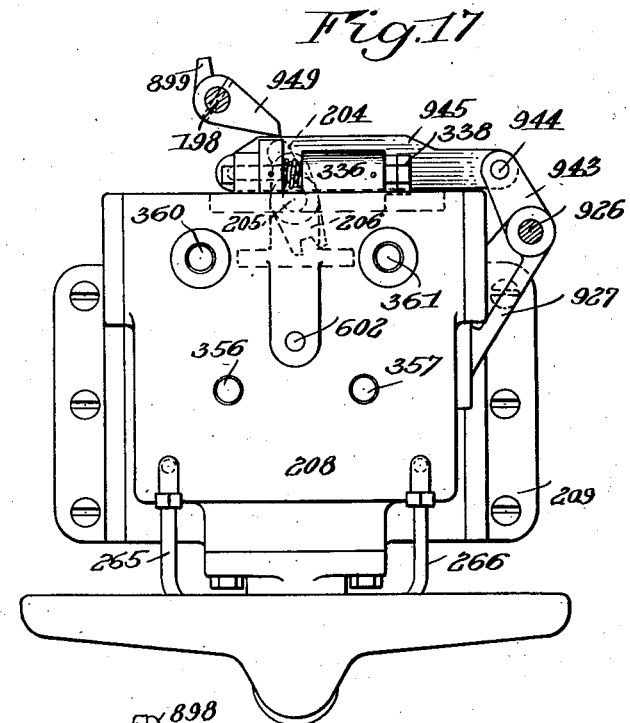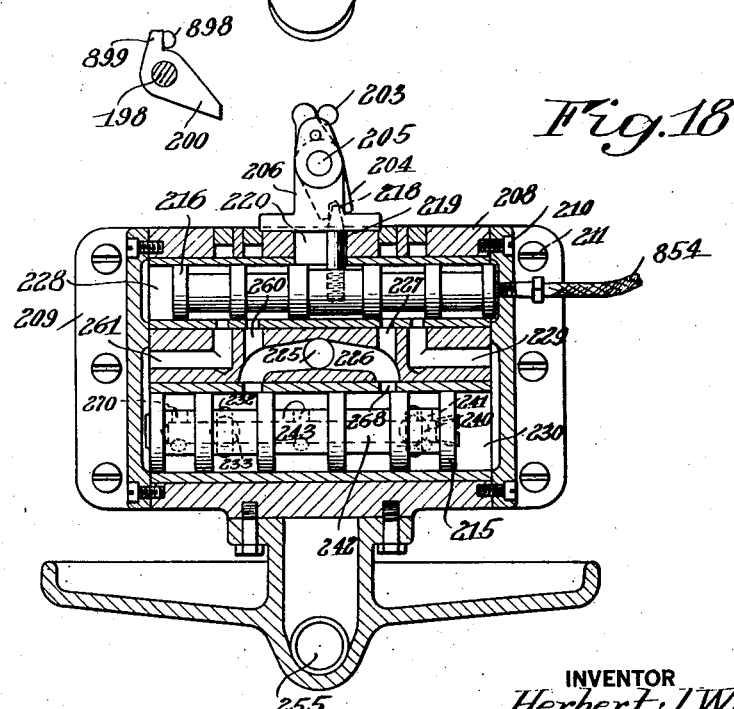

Sept. 6, 1932.  H. J. WHITE  1,876,372
COMPLETELY AUTOMATIC GEAR CUTTING MACHINE
Filed Sept. 28, 1929  20 Sheets-Sheet 11
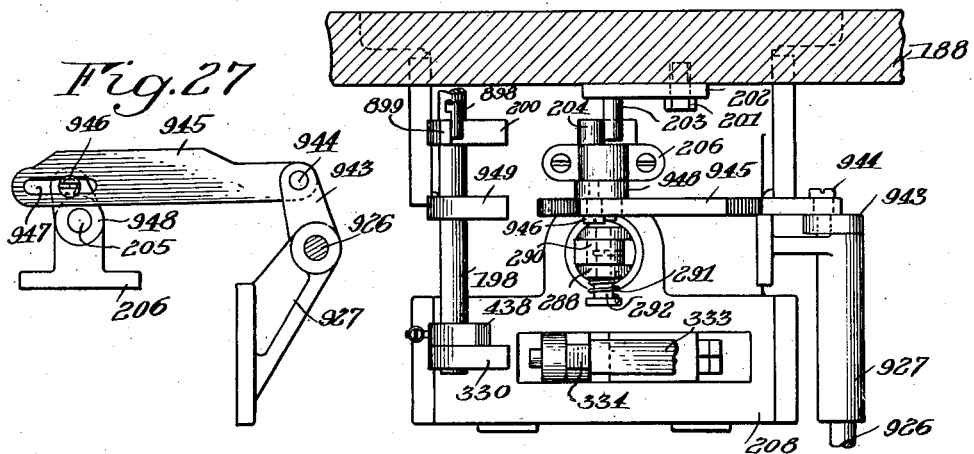
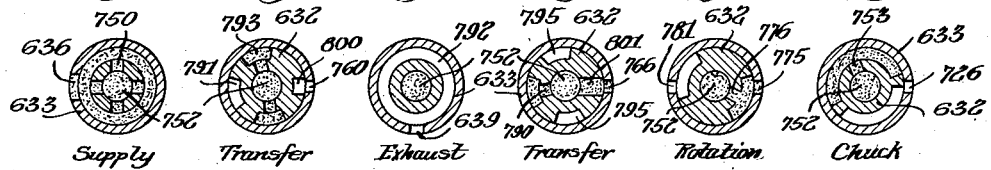
Supply  Transfer  Exhaust  Transfer  Rotation  Chuck
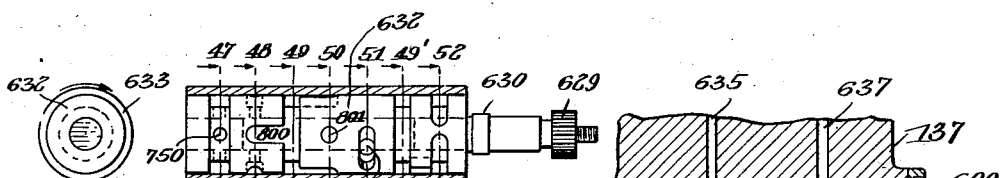
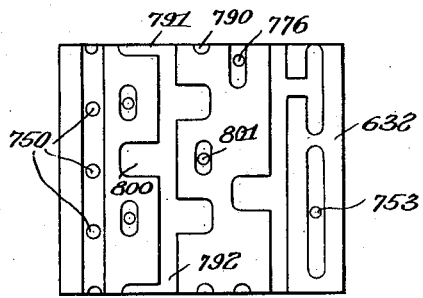
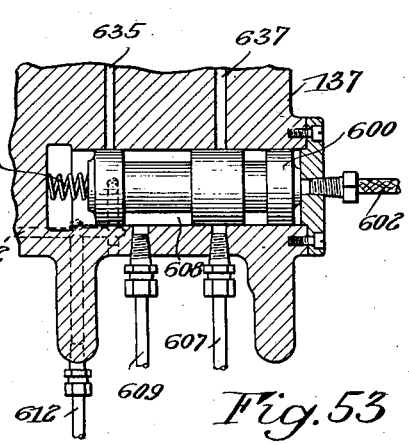
INVENTOR
Herbert J. White
BY
ATTORNEY

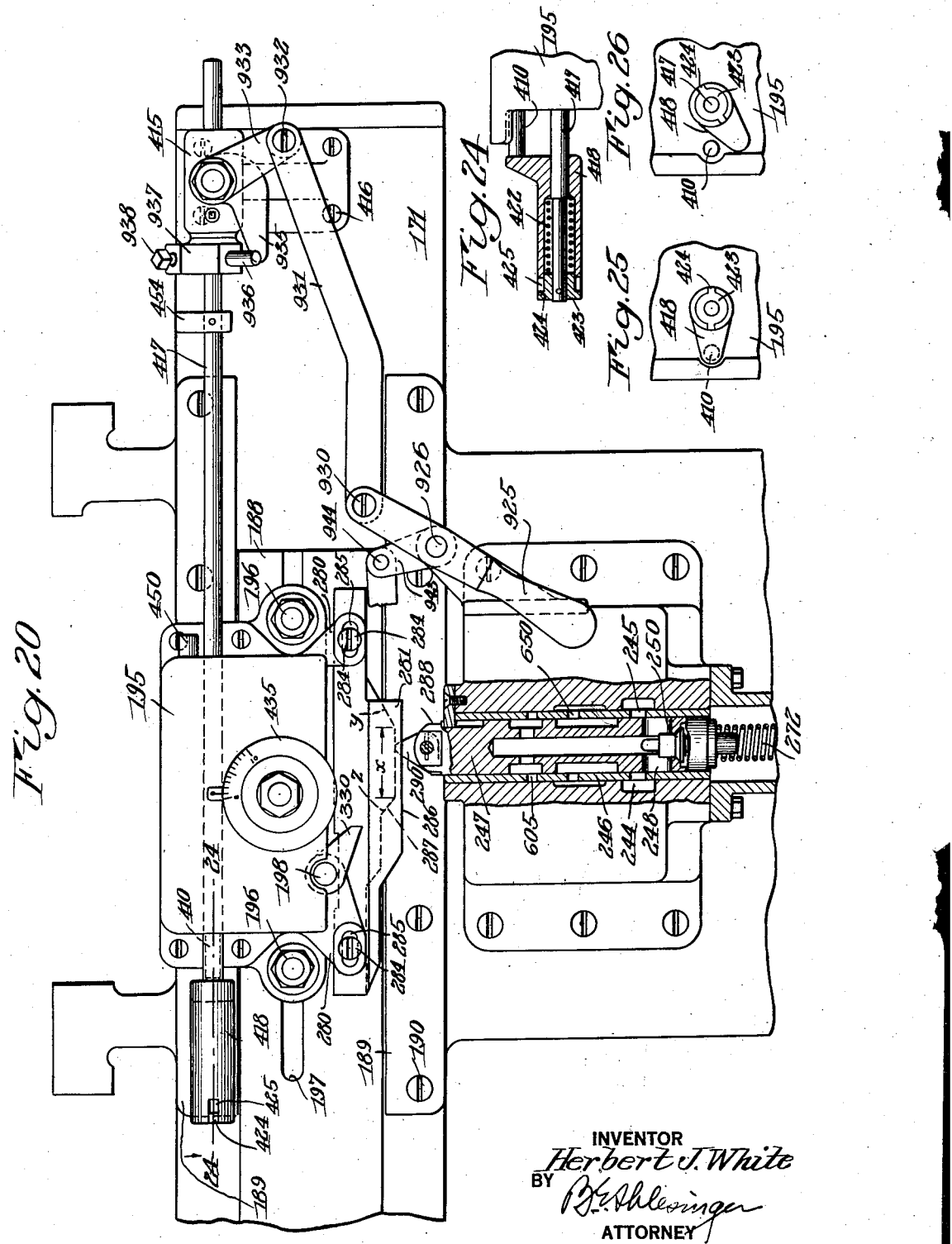

Sept. 6, 1932.   H. J. WHITE   1,876,372
COMPLETELY AUTOMATIC GEAR CUTTING MACHINE
Filed Sept. 28, 1929   20 Sheets-Sheet 14
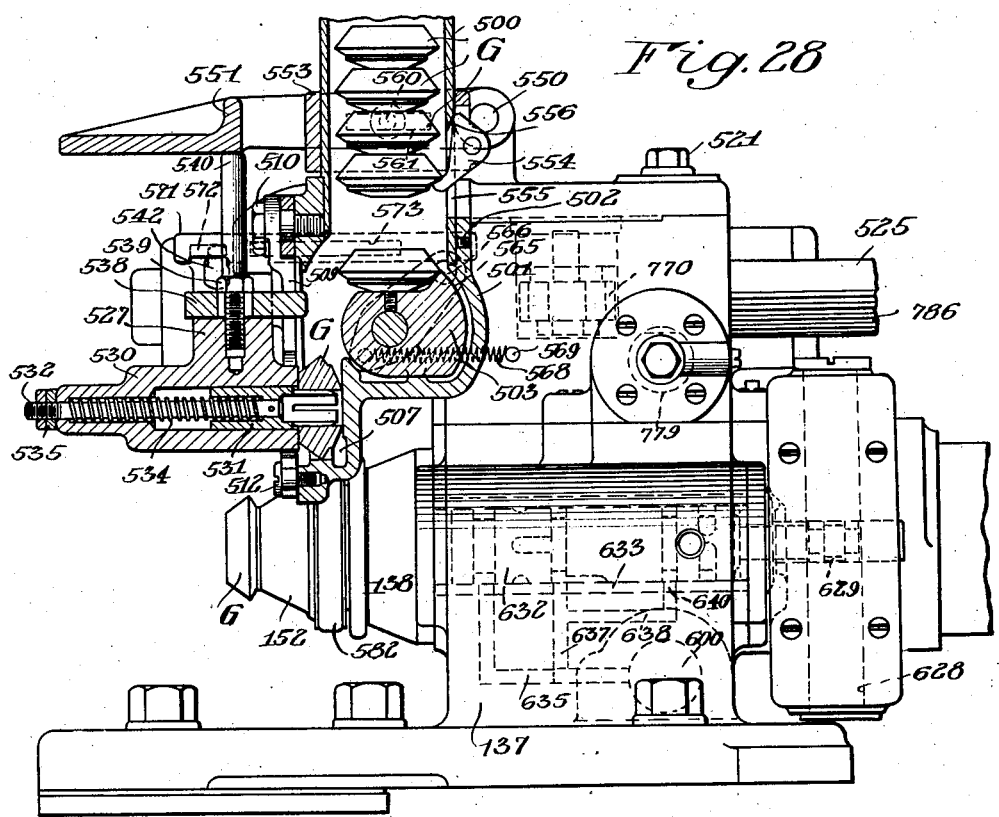
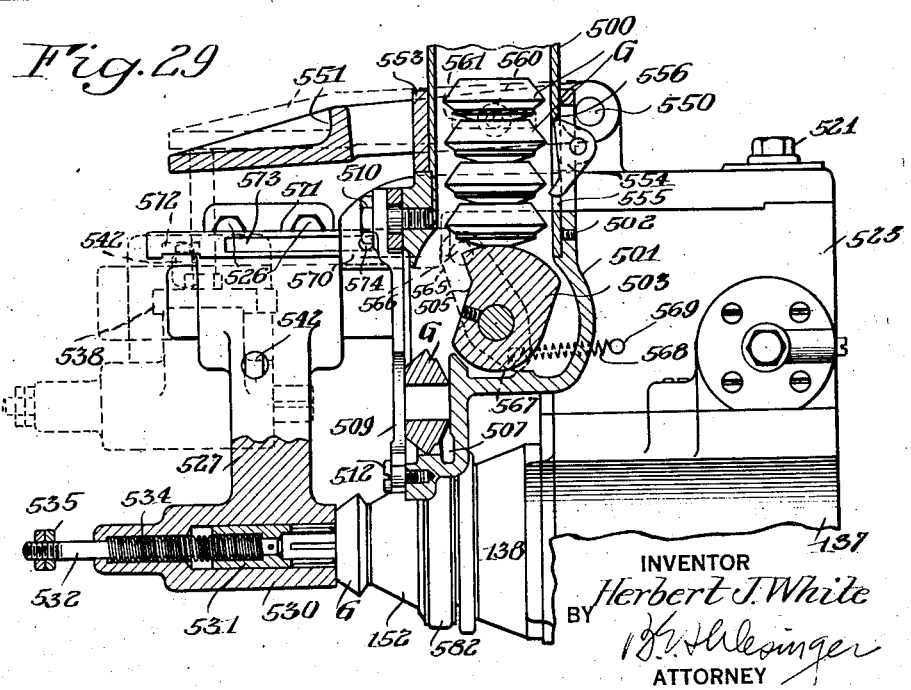
INVENTOR
Herbert J. White
BY
ATTORNEY

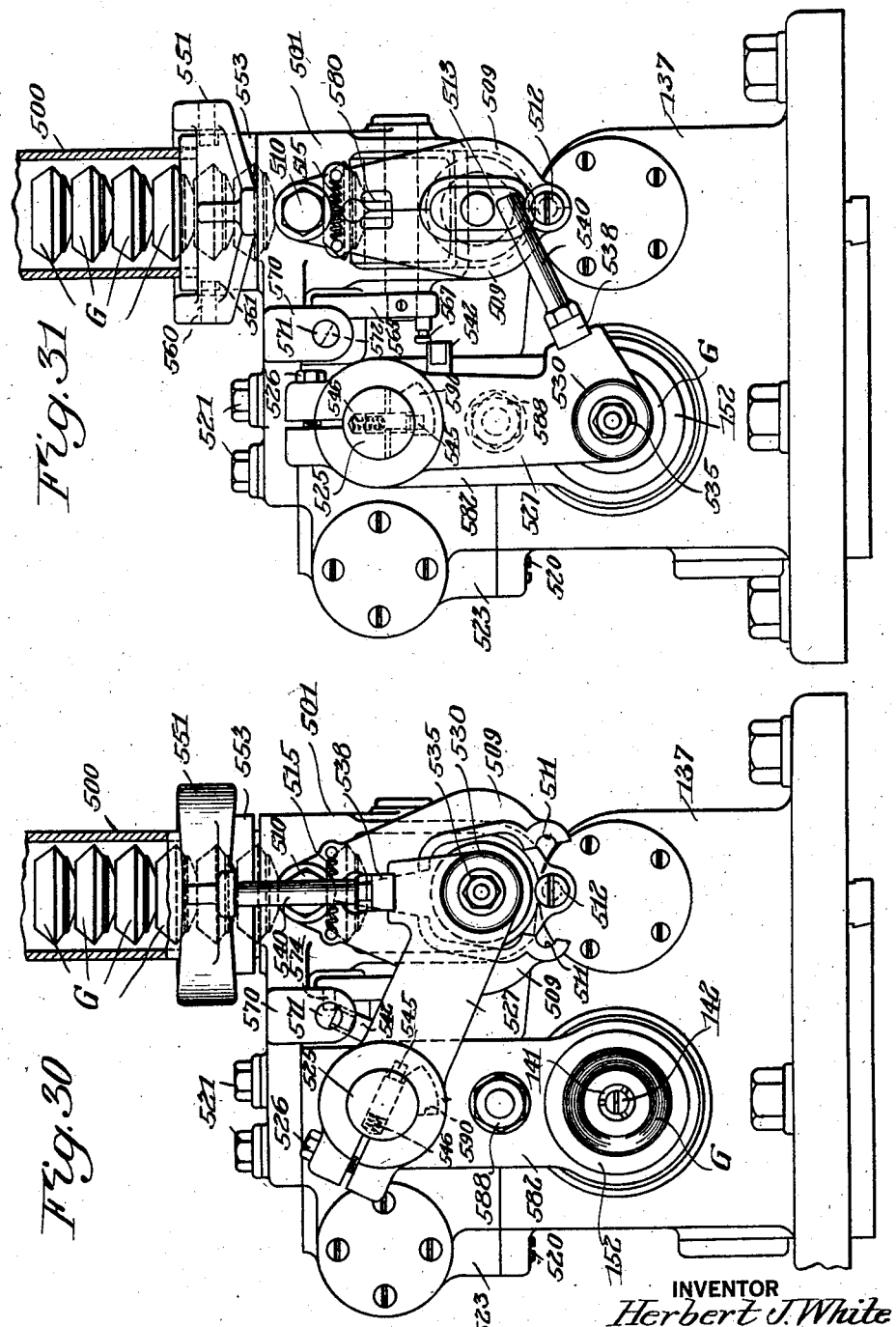

Sept. 6, 1932.    H. J. WHITE    1,876,372
COMPLETELY AUTOMATIC GEAR CUTTING MACHINE
Filed Sept. 28, 1929    20 Sheets-Sheet 16
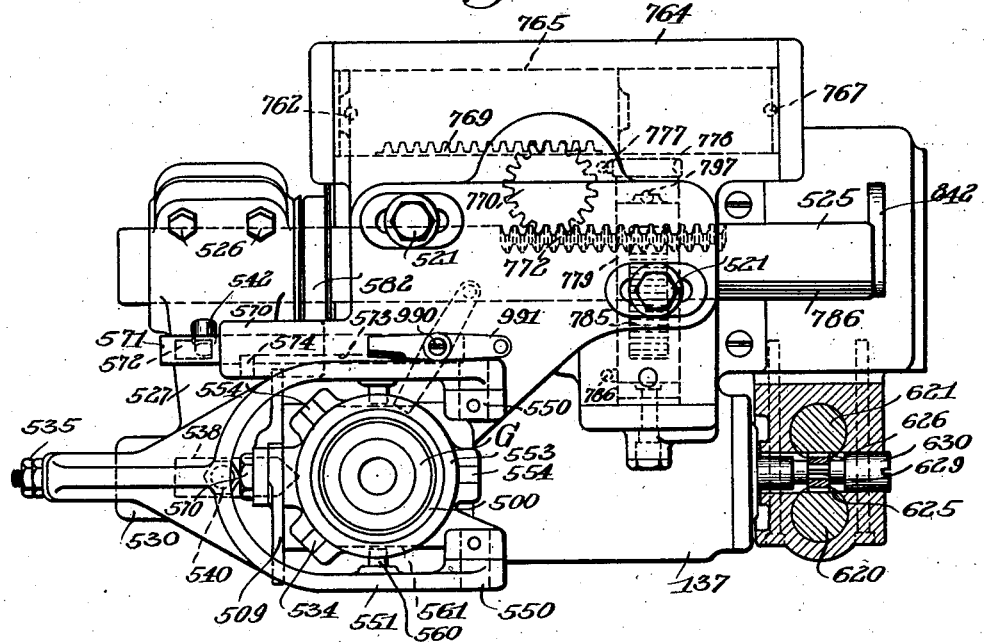
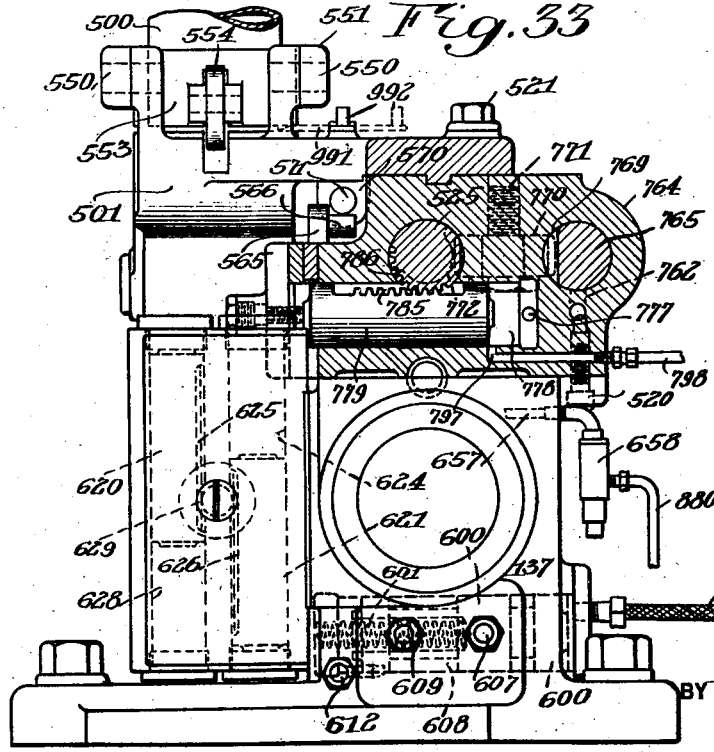
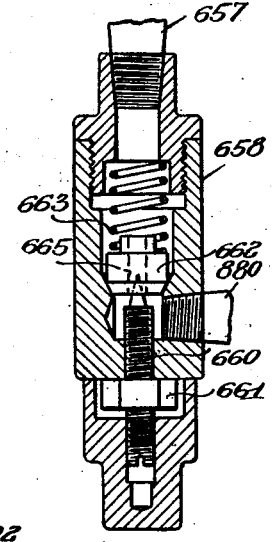
INVENTOR
*Herbert J. White*
BY
*B. W. Schlesinger*
ATTORNEY

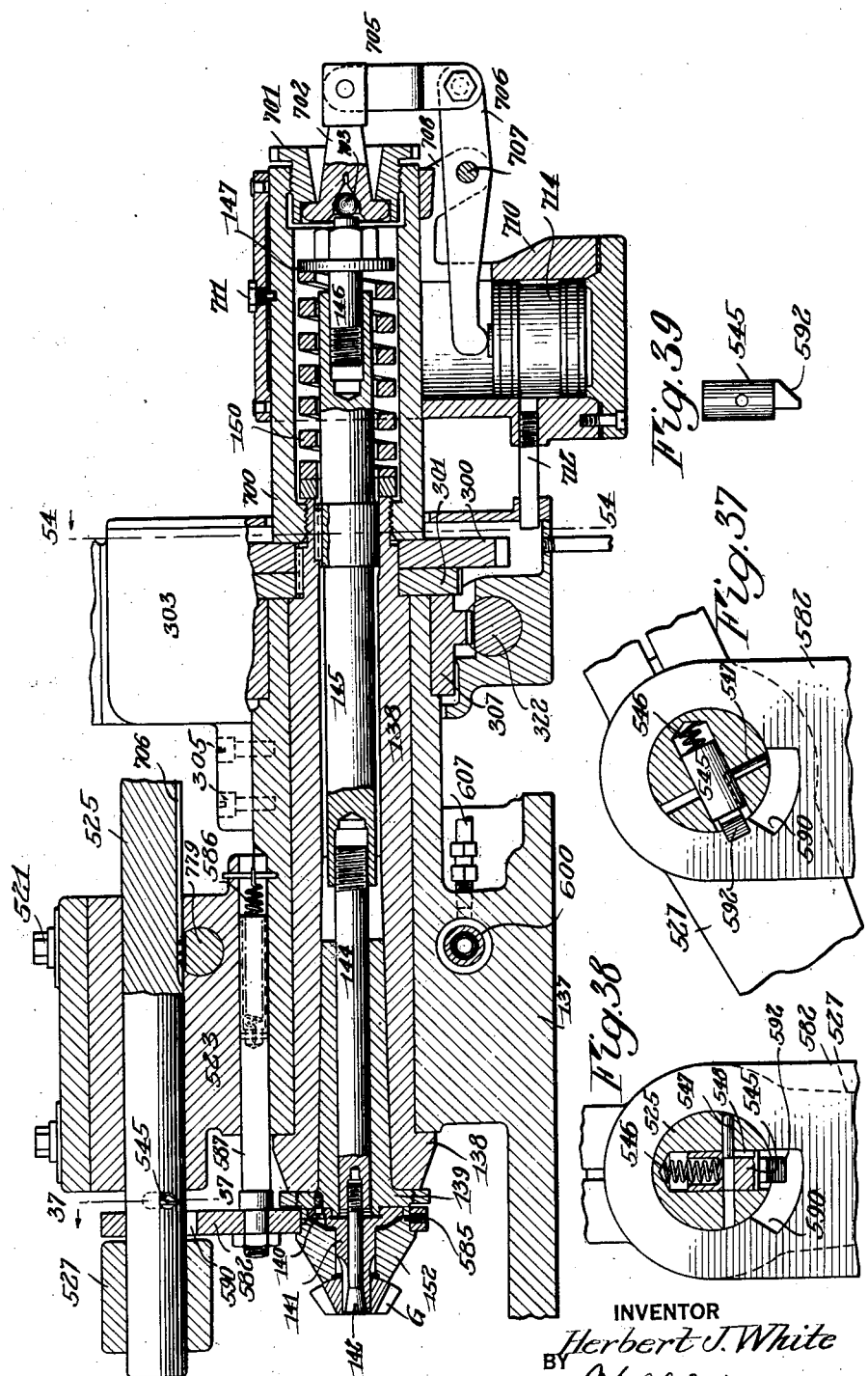

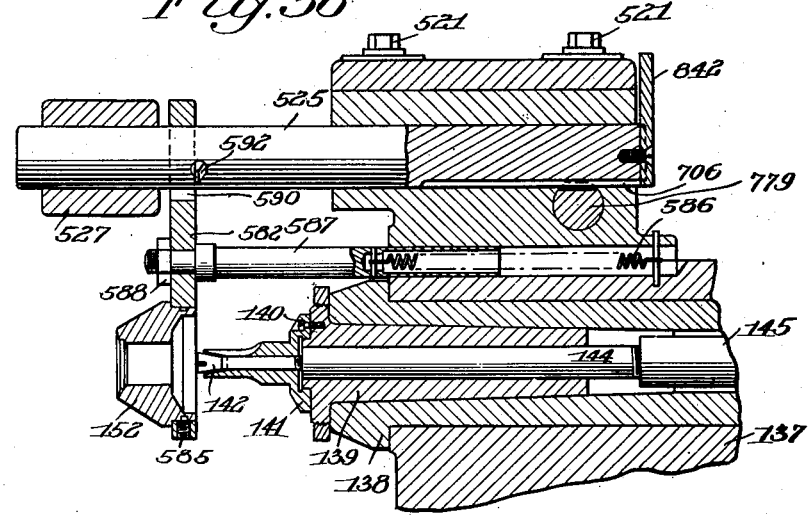
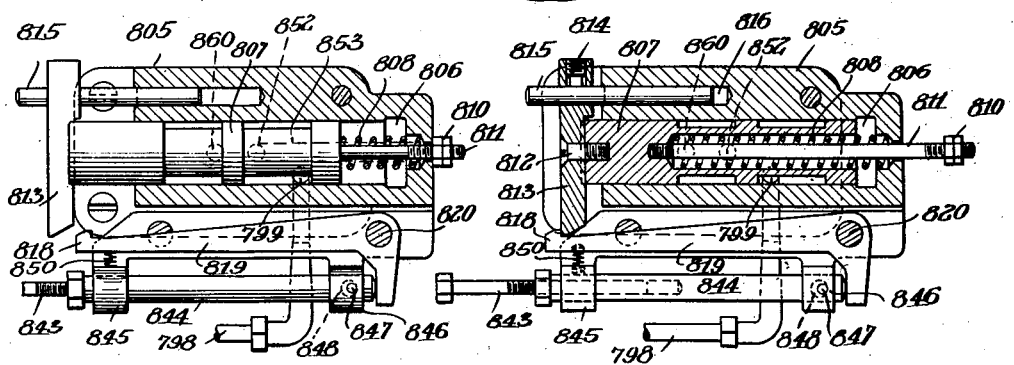
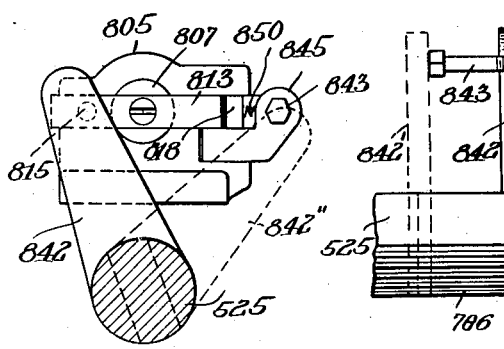
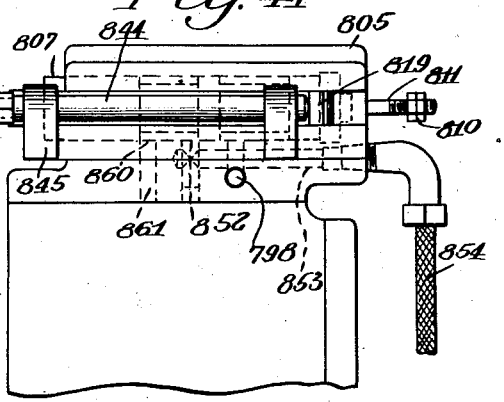

Sept. 6, 1932.  H. J. WHITE  1,876,372
COMPLETELY AUTOMATIC GEAR CUTTING MACHINE
Filed Sept. 28, 1929  20 Sheets-Sheet 19
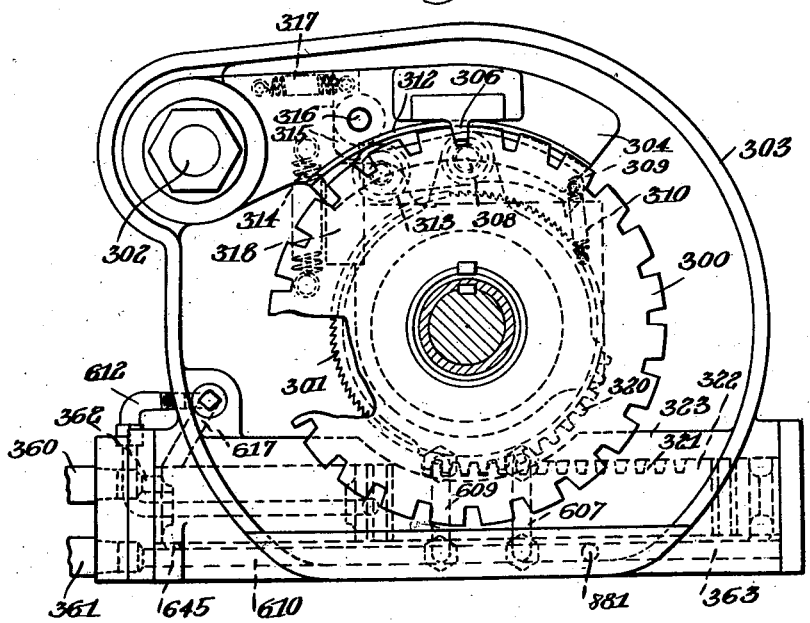
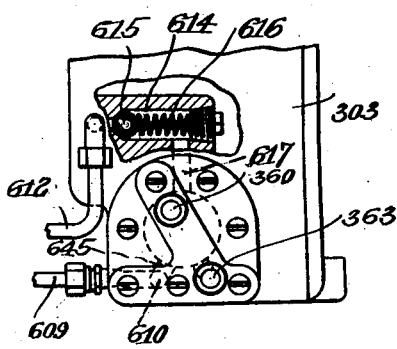
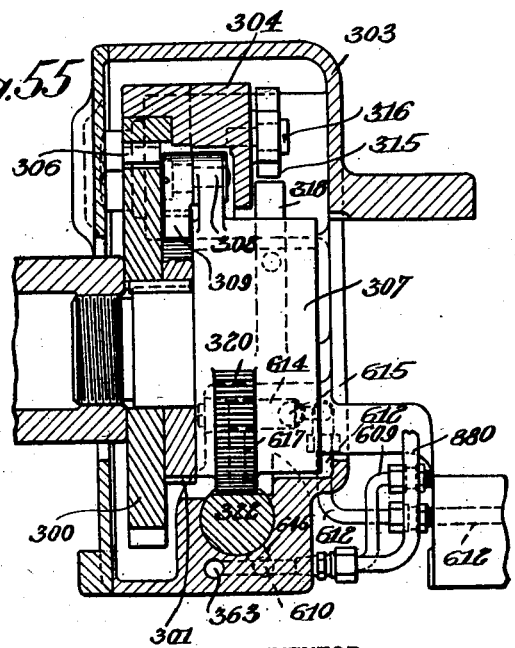
INVENTOR
Herbert J. White
BY
ATTORNEY

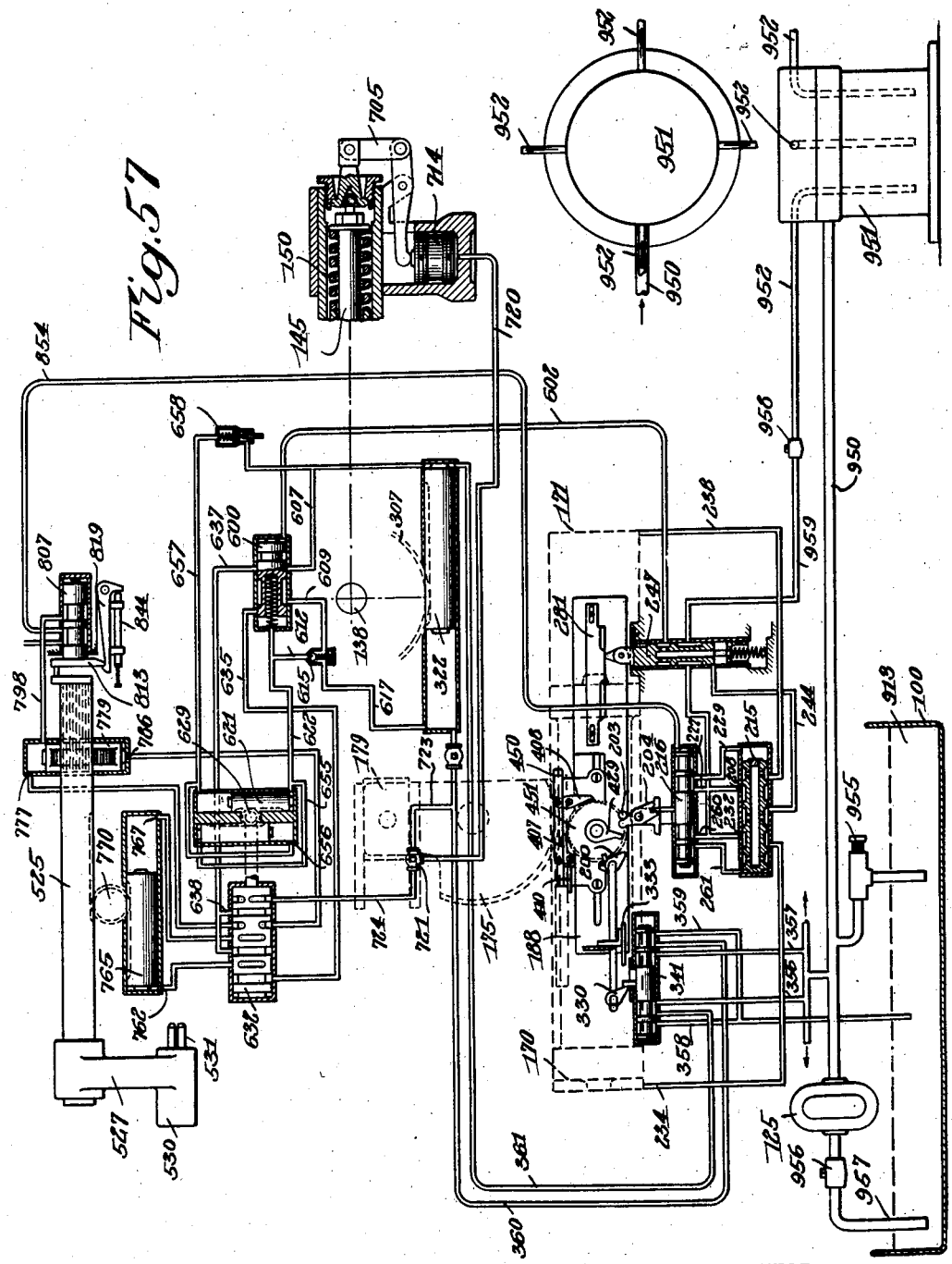

Patented Sept. 6, 1932

1,876,372

UNITED STATES PATENT OFFICE

HERBERT J. WHITE, OF ROCHESTER, NEW YORK, ASSIGNOR TO GLEASON WORKS, OF ROCHESTER, NEW YORK, A CORPORATION OF NEW YORK

COMPLETELY AUTOMATIC GEAR CUTTING MACHINE

Application filed September 28, 1929. Serial No. 395,942.

The present invention relates to machine tools and particularly to machines for producing gears.

A primary purpose of this invention is to provide an improved form of machine of the type described in my pending application Serial No. 325,841, filed December 13, 1928, in which the operations including both cutting and loading are fully automatic.

The invention is shown as applied to a machine for roughing bevel gears in which a single rotary milling cutter operates simultaneously upon a plurality of gear blanks spaced about the periphery of the cutter. On the machine, shown, four blanks can be cut simultaneously. These are mounted upon four independent work heads arranged around the cutting tool. Each head is alternately fed into and withdrawn away from the cutting tool to permit alternate cutting of the tooth spaces of the blank and indexing. After the last tooth space has been cut in the blank, the work head is automatically withdrawn from engagement with the tool to loading position, the completed gear is pushed off the arbor and by operation of the automatic loading mechanism is replaced with a new blank. This blank is automatically chucked on the arbor. The work head is then automatically returned into operative relation with the cutter for the cutting of the new blank.

Among the purposes of the present invention is to provide an improved form of loading mechanism which will be simpler in operation and more easily timed; to provide an improved form of magazine which will permit of handling more blanks with a considerable reduction in the space required; to provide a simpler form of index mechanism; to provide a simpler and more rigid work head drive; to provide a simple, inexpensive form of control device which can be built as part of the machine, for governing the number of teeth to be cut in each blank; to provide means whereby the operation of the machine can be controlled manually at any time if desired.

The principal features and purposes of this invention have been referred to above. Other objects of the invention will be apparent hereinafter from the specification and from the recital of the appended claims.

One embodiment of the invention is illustrated in the accompanying drawings in which:

Figure 2 is a side elevation of one of the four work units of the machine;

Figure 3 is a plan view of this unit showing also a fragment of the cutter;

Figure 4 is a plan sectional view of the base of the machine;

Figure 5 is a fragmentary vertical sectional view taken substantially on the line 5—5 of Figure 4 and showing details of the cutter drive;

Figure 6 is a section taken substantially on the line 6—6 of Figure 4, showing particularly the trough in which the completed gears, chips and oil are separated from each other;

Figure 7 is a section on the line 7—7 of Figure 6;

Figure 8 is a plan view of one of the columns or supports on which one of the work heads is mounted, showing the work head drive with the parts in the position they assume when a blank is being cut;

Figure 9 is a similar view showing the parts in the position they take when the work head is withdrawn for indexing;

Figure 10 is still another view showing the position which the parts assume when the work head is fully withdrawn to permit loading;

Figure 11 is a sectional view through one of the work head columns, taken substantially on the line 11—11 of Figure 8;

Figure 17 is a front elevation of the valve control box;

Figure 18 is a section on the line 18—18 of Figure 15;

Figure 19 shows in plan the control valve housing with the various valve trips;

Figure 20 is a fragmentary elevational view of one of the work head columns, showing in elevation, the control device and the manual trip lever with associated parts and showing in section the speed control valve which is shown in the position it occupies when the work head is being fed into the cutter;

Figure 24 is a section on the line 24—24 of Figure 20;

Figures 25 and 26 are end elevations of the parts shown in Figure 24, showing the positions assumed by the trip dog, respectively, when in normal position and when swung away by the manual trip lever;

Figure 27 is a detail view showing the manually operative cam for throwing out the reverse trip dog;

Figure 28 is a fragmentary side elevation of one of the work heads, parts of the magazine and transfer arm associated therewith being shown in section and the transfer arm being shown in the position it has when the teeth are being cut in the blank;

Figure 29 is a fragmentary view of parts shown in Figure 28, the transfer arm being shown in the act of positioning a new blank on the work spindle;

Figure 30 is a front elevation of a work head with the parts in position corresponding to that shown in Figure 28;

Figure 31 is a view similar to Figure 30 with the parts in position corresponding to that shown in Figure 29;

Figure 32 is a partial plan view of a work head;

Figure 33 is a rear end elevation of the parts shown in Figure 32, parts of the mechanism for actuating the transfer arm being shown in section;

Figure 34 is a detail view, showing in section the pressure valve which controls the speed of operation of the loading mechanism;

Figure 35 is a complete longitudinal sectional view through one of the work heads taken on a line passing through the work spindle and showing the position of the parts during cutting;

Figure 36 is a fragmentary sectional view of parts shown in Figure 35, showing how the movement of the transfer arm acts to strip the completed gear from the work spindle;

Figure 37 is a section on the line 37—37 of Figure 35 and Figure 38 is a similar view showing the escapement of the operating catch from the stripper-bar;

Figure 39 is a detail view, showing the dog which operates the stripper bar;

Figures 40 and 41 are plan sectional views of the safety valve and associated parts, showing, respectively, the position of these members when the valve has been tripped when a blank has been loaded correctly on the work spindle and the position of these members when the valve has been reset by the transfer arm on its return to the magazine;

Figure 42 is a fragmentary side elevation of a work head showing the safety valve and in full and dotted lines the two positions of the valve trip lever;

Figure 43 shows the safety valve in front elevation and in full and dotted lines, the two positions of the valve trip lever;

Figures 44 and 45 are an end view and a side elevation, respectively, of the loading valve;

Figure 46 is a layout of this valve and Figures 47 to 52 inclusive are sections through this valve taken on the lines denoted by corresponding reference numerals in Figure 45 with the exception that Figure 49 is to be regarded as a sectional view on either the line 49—49 of Figure 45 or the line 49—49' of the same figure;

Figure 53 is a detail sectional view showing the transposing valve and associated parts;

Figure 54 is a view taken substantially on the line 54—54 of Figure 35 showing the index mechanism of one of the work heads;

Figure 55 is a sectional view through this mechanism taken at right angles to Figure 54;

Figure 56 is a fragmentary side elevation of the parts shown in Figure 54, showing in section the check valve;

Figure 57 is a diagrammatic view illustrating the operation of one of the work units; and Figure 58 is a more or less diagrammatic plan view illustrating the pressure stabilizing chamber of the machine and showing the pipe connections between said chamber and the sump and between said chamber and the four work heads.

In the present machine, with the exception of the tool and its drive, the parts are all hydraulically operated. In many features, however, the invention is independent of this mode of operation and is not to be considered as restricted thereto. Moreover, while the invention is described in connection with a machine for roughing bevel gear blanks, it will be understood that it is capable of wide application to various types of machines for producing gears or other articles.

Figure 1:
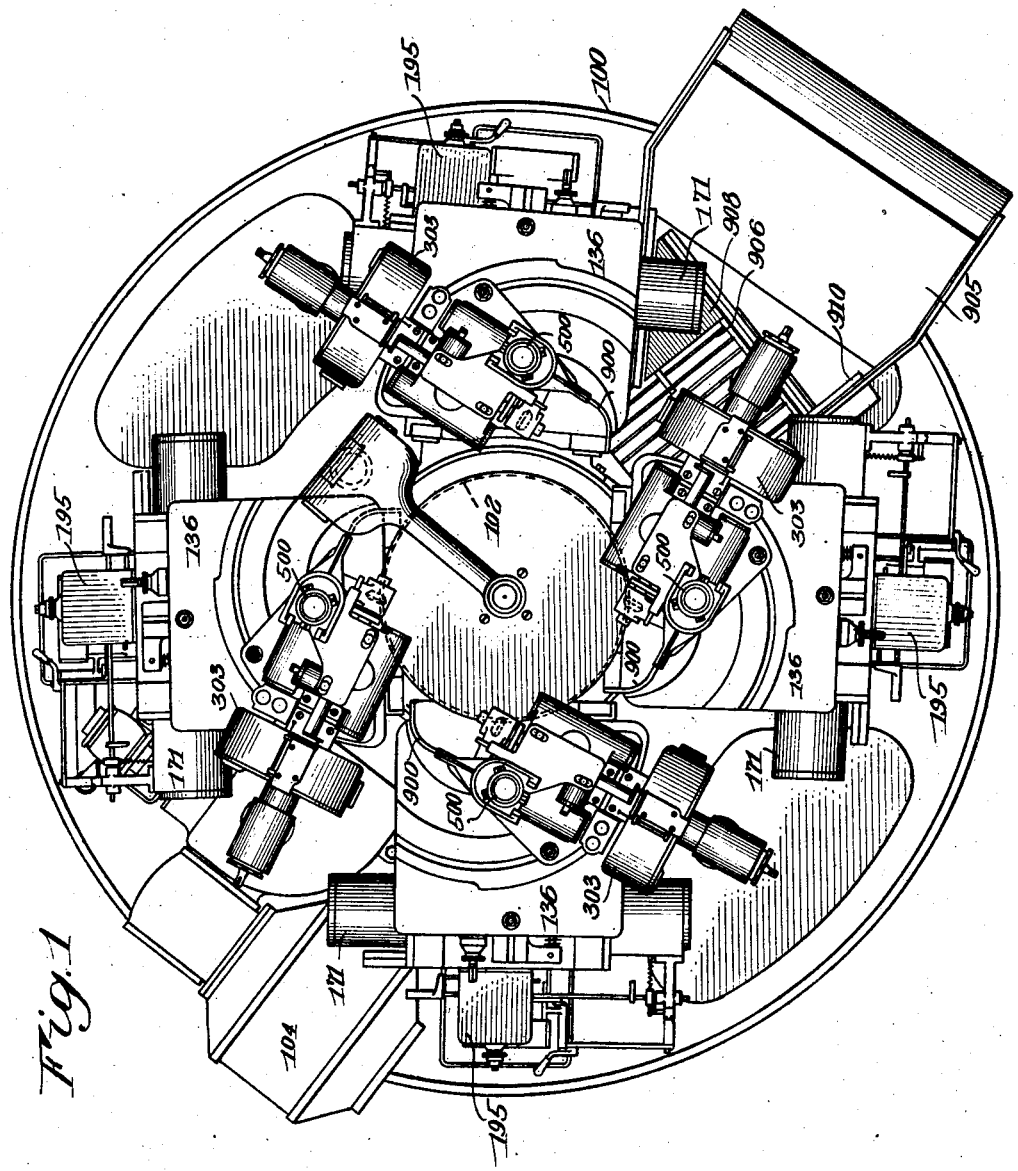
Figure 1 is a plan view of a bevel gear roughing machine built according to a preferred embodiment of this invention.

Referring to the drawings by numerals of reference, 100 indicates the base or frame of the machine shown. Journaled in suitable bearings centrally in this frame is a cutter spindle 101, (Figs. 1 and 5). Secured to this spindle 101 at its upper end is the cutting tool 102, a large disc milling cutter provided with a plurality of inserted blades. This milling cutter 102 is rotated continuously during the operation of the machine from a motor 104 (Figs. 1 and 4) through the bevel gearing 105, 106 (Fig. 4), the shaft 107, the speed change gears 108 and 109, (Figs. 4 and 5), the shaft 110, the bevel gears 111 and 112, the shaft 113, the spur pinion 114 and the internal gear 115 which is secured to the cutter head by means of bolts 116.

The cutting oil pump 120 which pumps the coolant on to the cutter at the several cutting points is driven from the shaft 107 through the bevel gears 121 and 122. The gear pump 125 which pumps the oil for actuating the various hydraulically controlled and operated parts of the machine, is driven from the same shaft 107 through the bevel gear 126 which meshes with the bevel gear 121. The various parts of the cutter drive are lubricated from the plunger pumps 128 and 129 which are actuated by the double cam member 130 which is secured to the shaft 110.

Mounted on the base of the machine and secured thereto and to the central column or housing which supports the cutter spindle are the four uprights or columns 132 which serve as supports for the four work heads (Figures 2, 11 and 8). As clearly shown in Figure 4, these columns or supports 132 are not spaced exactly 90° apart around the cutter spindle housing but are spaced apart distances differing slightly from 90° in each case. The purpose of this arrangement is to position the work heads so that the blades will not be in the same relation to all the blanks and that preferably at most only two of the blanks will be engaged simultaneously by the cutter. In this way, the heavy load which would otherwise be placed on the cutter were it cutting simultaneously into four blanks is avoided.

All of the work units comprising, in each case, the supporting column, the work head, the loading mechanism and the various associated parts are built alike. A description of one unit will suffice, then, for a complete understanding of the invention and only one unit will be described specifically, therefore, hereinafter.

Each column or upright 132 is formed at its upper end with ways 135 (Figures 2, 3, 8 and 9) on which slides the work head carrier 136.

Mounted on the work head carrier 136 for angular adjustment thereon is the work head 137.

Journaled in the work head 137 is the work spindle 138 (Fig. 35). Secured within the bore of this spindle is an arbor 139. Secured to the arbor 139 at its front end, as by means of the screws 140, is an expanding arbor 141. This arbor 141 is slotted to provide a plurality of gripping fingers which are adapted to be expanded by movement of a taper pin 142 axially in the spindle to grip and clamp the gear bank G, which is to be cut, on the spindle (see Figs. 35 and 36).

The tapered expanding member 142 is moved axially by the draw-bar 144 into which it is threaded. The draw-bar 144 is threaded into a draw rod 145 into the outer end of which is threaded a bolt 146. Interposed between the washer 147 which is mounted on the bolt 146 and the end of the spindle 138 is a coil spring 150 which serves to urge the tapered member 142 constantly into work-clamping position. The work is released by movement of the tapered member 142 forward in the spindle 138 against the resistance of the spring 150. The means for releasing the chuck will be described hereinafter.

When the gear blank G is clamped on the work spindle, it seats against a nose-piece 152 which is interposed between the gear blank and front face of the arbor 139.

By using nose-pieces of different thicknesses, it is possible to adjust the blank to be cut for different cone distances. The angular adjustment of the work head 137 on the work head carrier 136, which may be effected manually or in any other suitable manner, is for the purpose of setting the gear blank to the correct root angle. The work head carrier 136 is itself adjustable with reference to the operating slide 155 (Figs. 2, 3, 8, 10 and 11) to permit setting the blank to cut tooth spaces of the required depth. This latter adjustment is effected by rotation of the screw 156 which is secured to the work head carrier 136 and threads into a lug 158 formed on the operating slide 165. The angular adjustment of the work head 137 on the work head carrier 136 can be accomplished accurately through use of the scale 159 and the work head can be secured in any adjusted position by means of the bolts 160, the heads of which engage in the arcuate T-slot 161 formed in the upper face of the work head carrier 136. The adjustment of the work head carrier 136 on the operating slide 155 can be effected by use of the dial indicator 162 and the work head carrier 136 is secured in any adjusted position to the operating slide by means of the T-bolt 164 which engages in the T-slot 165 formed in the operating slide.

In the cutting of a gear, the work head is alternately fed toward and moved away from the cutter. On the feed movement, a tooth space is cut in the blank and on the withdrawal motion, the blank is indexed. This alternate feed and withdrawal motion is effected by reciprocation of the operating slide 155 to which the work head carrier 136 is secured.

The mechanism for reciprocating this operating slide 165 will now be described. This includes a piston 170 (Figs. 10 and 11) which reciprocates in a cylinder 171 (Figs. 2, 3, 10 and 11). The cylinder 171 is cast integral with the upright or column 132. The piston 170 has rack teeth 172 cut into one side of it, intermediate its ends. The cylinder 171 is open at the side adjacent the rack teeth 172, as clearly shown in Figure 11, and the piston 170 carries piston rings 173 at both ends to prevent leakage of the motive fluid along the piston. The teeth 172 of the piston mesh with the segmental teeth 174 cut into the periphery of a crank 175. This crank member 175 is keyed to a shaft 176 which is mounted in suitable bearings in the column 132. The crank member 175 carries a crank pin 178 on which is pivotally mounted the block 179 that slides in the slot 180 formed in the operating slide 155.

It will be seen that as the piston 170 is reciprocated in the cylinder 171, the crank 175 will be oscillated to move the operating slide 155 toward or away from the cutting tool, thereby feeding the work alternately into depth and withdrawing it for indexing. Figure 8 shows the position of the operating slide and its actuating parts when the blank is in cutting position and Figure 9 shows the position of these parts when the blank has been withdrawn for indexing. For the purposes of illustration, the blank G is shown in these two figures to indicate the positions which it assumes during cutting and indexing, respectively.

Figure 13:
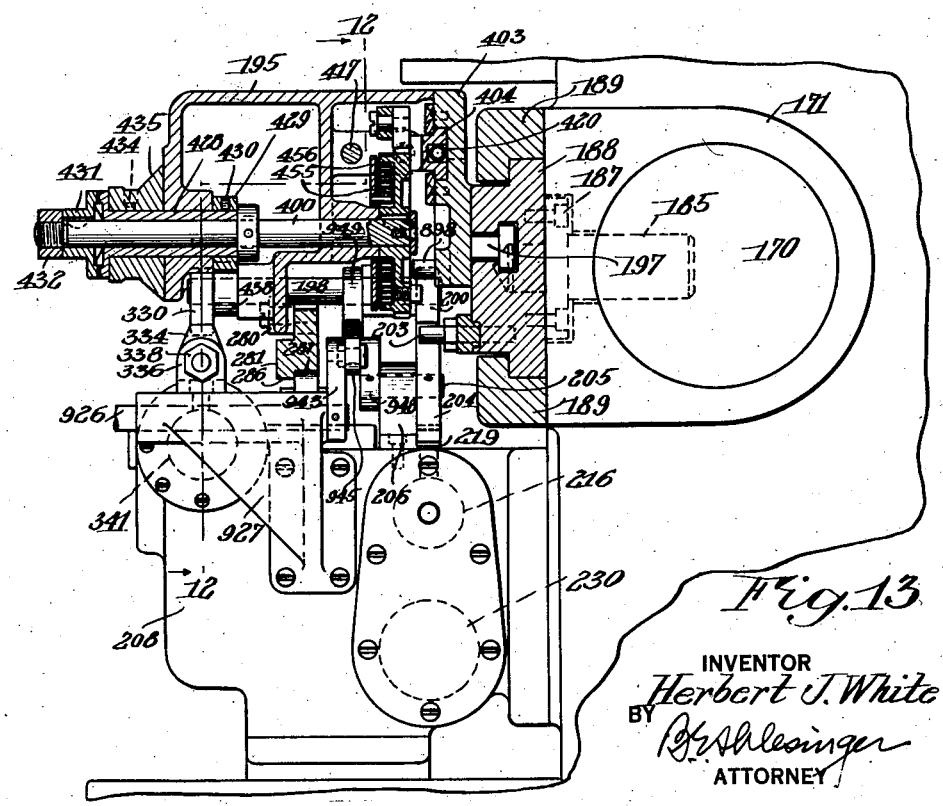
Figure 13 is a sectional view at right angles to Figure 12, being taken on the line 13—13 of Figure 12.

The piston 170 is operated by fluid pressure. Secured in the piston 170 at a point diametrically opposite the rack teeth 172 is a stud 185 (Figures 10, 11 and 13). This stud 185 may be secured to the piston by a press fit or in any other suitable manner. This stud 185 passes through an elongated slot 186 in the cylinder 171. Secured to the head of the stud 185, as by means of screws 187 is a plate 188. This plate 188 is external of the cylinder 171 and moves in guides 189 which are secured to the cylinder wall by screws 190.

Adjustably mounted on the plate 188 is a control box, the purpose of which will be described more particularly hereinafter. This control box 195 houses the parts of the mechanism controlling the number of teeth to be cut in the blank. It is secured in any adjusted position on the plate 188 by means of T-bolts 196 which engage in T-slots 197 formed in the face of the plate 188.

Figure 12:
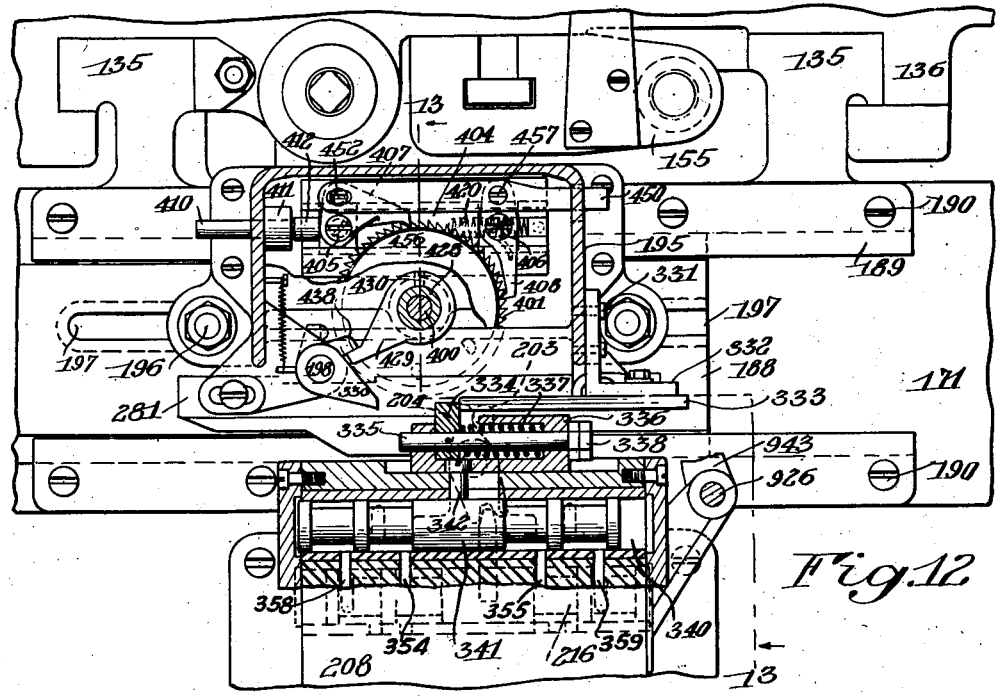
Figure 12 is a view taken substantially on the line 12—12 of Figure 13, showing details of a control device, of which one is provided with each work head, each of which is adjusted according to the number of teeth to be cut in the blank mounted on that work head.

Journaled in the box 195 is a shaft 198 (Figures 12, 13, and 19). This shaft 198 carries a stop dog 200. Secured to the plate 188, as by means of a bolt 201 is a plate 202 carrying a stop-pin 203.

Figure 15:
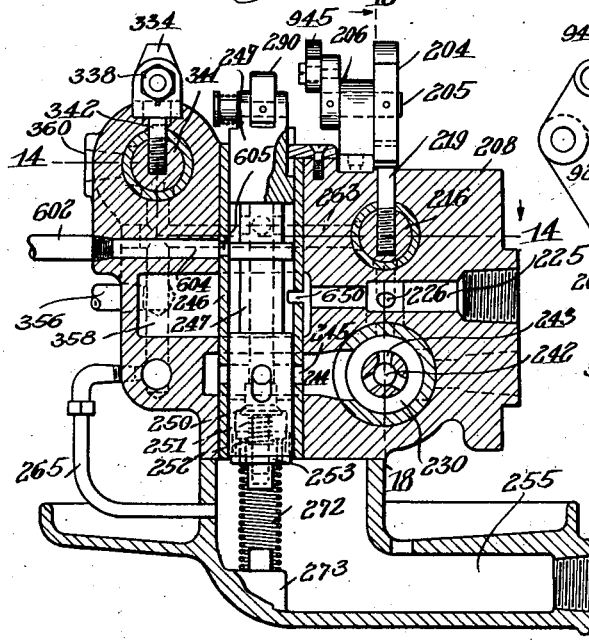
Figure 15 is a section on the line 15—15 of Figure 14.

In the reciprocating movement of the piston 170, these two stops 200 and 203 are adapted to engage alternately with a trip dog 204 that is secured to a stud 205 (Figures 13, 18, and 15) that is rockably mounted in a plate 206 which is secured to a casting 208 which houses the index, feed and speed control valves. The ends of this casting are closed by side plates 209 which are secured to the casting by screws 210. The side plates 209 are themselves secured to the upright or column 132 by screws 211 and so secure the casting 208 to this column.

The direction of movement of the piston 170 is controlled by the main reversing valve 215 and the auxiliary reversing valve 216, both of which are housed in the casting 208. The auxiliary reversing valve 216 is shifted by the trip member 204, which has a notch 218 cut into its periphery to engage the pin 219 which is threaded into the valve 216 and extends through a slot 220 opening into the casting 208.

Both the valves 216 and 215 are of balanced construction. In the position shown in Figure 18, the pressure fluid flows into the bore 225 (Fig. 15) of the casting 208, this bore being connected through suitable piping with the fluid pressure pump 125. Thence the supply passes into a bifurcated opening 226 through an opening 227, that communicates with the opening 226, into the chamber 228 in which the valve 216 slides. The fluid flows back through the opening 229 into chamber 230 of the valve 215 forcing the valve 215 to the position shown in Figure 18. In this position, the pressure fluid flows from the bifurcated opening 226, through the port 232 of the valve chamber 230, through the bore 233 which communicates with this chamber, through the pipe 234 (Fig. 2) into the port 235 of the cylinder 171.

From the other end of the cylinder 171, the fluid exhausts through the port 237, the pipe 238 (Figs. 8, 9 and 2), the bore 240 (Figs. 14 and 18) into the valve chamber 230.

Figure 21:
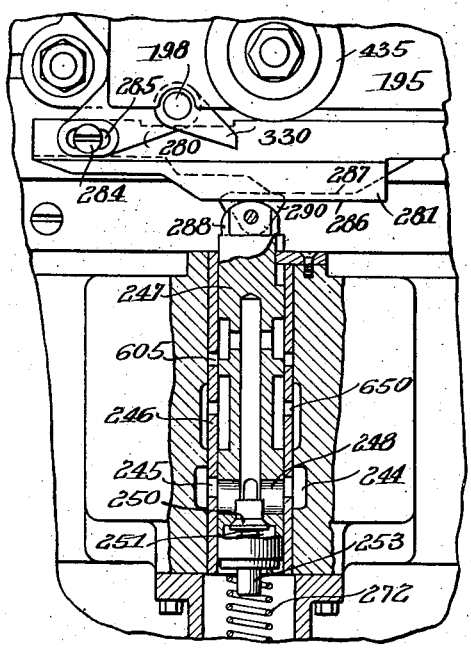
Figure 21 is a fragmentary view of parts shown in Figure 20, the speed control valve being shown in the position it occupies when the work head is moving out for indexing.
Figure 22:
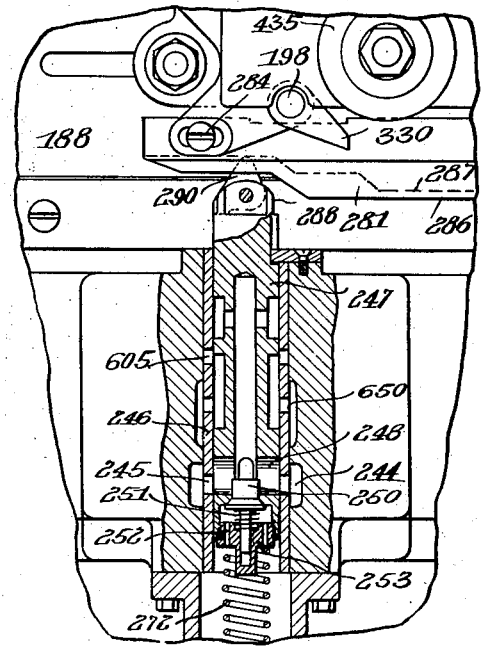
Figure 22 is a view similar to Figure 21, showing the position assumed by the speed control valve when the work head is moving to loading position.

Thence the exhaust oil passes through the port 241 in the valve 215 into the longitudinal opening 242 in this valve, thence through the three openings 243 (Figs. 15 and 18) into the bore 244. The exhaust fluid passes from the bore 244 through the ports 245 formed in the sleeve 246 that surrounds the speed control valve 247, (Figs. 20, 21 and 22). In its flow thence the exhaust fluid opens the valve 250 in the bottom of the valve 247 against the resistance of the spring 251. The exhaust fluid then flows through the openings 252 in the piece 253 (Fig. 15) into the bore 255 which is connected with the sump or reservoir of the machine. The member 253 is threaded into the bottom of the valve 250.

It will be seen that by moving the valve 247 to control the area of opening of the port 245, the flow of the exhaust fluid from the cylinder 171 can be controlled, thereby making it possible to control the speed of movement of the piston 170 and of the work head which is actuated thereby. By throttling the exhaust from, instead of the supply to, the cylinder 171, a smoother, more even movement of the work head can be obtained. With this arrangement, both sides of the main piston are under pressure and the speed of movement of the piston is controlled by the degree of opening of the valve 247. The means by which the valve 247 is moved to throttle the exhaust will be described below.

Through the connections described, the piston 170 is moved in one direction in the cylinder 171. When it reaches the limit of its movement in this direction, the trip member 204 (Fig. 18) strikes the stop 203, reversing the valve 216 in its chamber 228. The pressure fluid now flows from the bore 225 and the bifurcated opening 226 into the duct 260, thence through the duct 261 into the valve chamber 230, moving the valve 215 in this chamber to the right from the position shown in Fig. 18.

The duct 227 will have been shut off from communication with the duct 229 by the movement of the valve to the left from the position shown in Figure 18. The motive fluid exhausts from the chamber 228 of the valve 216 alternately through the ducts 263 and 264 (Fig. 14) in the casting 208 into the pipes 265 and 266 (Figs. 2 and 15) into the bore 255 whence it flows back into the sump.

With the valve 215 moved, as just described, to the right from the position shown in Figure 18, the pressure fluid will flow from the bifurcated opening 226 through the duct 268 into the valve chamber 230, thence through the bore 240 and the pipe 238 to the cylinder 171, reversing the direction of movement of the piston 170 in the cylinder and reversing the direction of movement of the work head.

At this time, the fluid exhausts from the opposite end of the cylinder 171 through the pipe 234, the bore 233 (Fig. 14), the port 232 in the valve 215, the bore 242 in this valve, the opening 243 in this valve, the bore 244, the ports 245 and 248 (Figs. 15 and 21) in the sleeve 246 and valve 247, respectively, through the valve 250, the openings 252, thence into the bore 255 (Fig. 15) and back to the sump.

The fluid in the valve chamber 230 (Fig. 18) is exhausted from this chamber through the openings 270 and 241 into the bore 242 and thence to the sump through the various ducts described.

The valve 250 (Fig. 15) which is spring-pressed upwardly by the coil spring 272 serves to prevent leakage of the motive fluid from the system when the machine stands idle. The spring 272 is interposed between the lower end of the piece 253 and the lug 273 formed on the casting 208.

During cutting and indexing, the piston 170 and the work head which is connected thereto travels back and forth within the limits set by the stops 200 and 203. The distance of this travel can be adjusted by adjusting the control box 195 (Figs. 12, 13 and 20) on the plate 198, thus adjusting the distance between the shaft 198, which carries the stop 200 and the stop 203 which is secured to the plate 188.

In the feed movement of the work head by which the blank is carried into the cutter to cut a tooth space in the blank, it is desirable that a slow feed motion be employed while in moving the work head away from the cutter to permit indexing of the blank, it is desirable that the withdrawal motion be effected at an accelerated speed in order to reduce as far as possible the amount of idle time of the machine. As stated above, the speed of movement of the work head is governed by the speed control or throttle valve 247. The means by which this valve 247 is controlled will now be described.

As stated above, the control box 195 travels with the piston 170. Secured to depending flanges 280 formed on this control box 195 (Figs. 13, 20, 21 and 22) is a cam bar 281. This cam bar is secured to the flanges 280 by screws 284 which pass through slots 285 formed in the ears or flanges 280. The cam bar 281 is formed with two separate cam surfaces one behind the other, which are designated, respectively, 286 and 287.

Pivoted between the ears 288 formed on the head of the valve 247 (Figs. 19, 20, 21 and 22) is a contact member 290. This contact member 290 is constrained to the position shown in Figure 20 by the coil spring 291 (Fig. 19) which is secured at one end to one of the ears 288 and at its other end to the pivot pin 292 of the contact member. During the cut, when the blank is being fed into the tool, the tip of the contact member 290 rides on the portion $x$ of the cam surface 287 so that the valve 247 is held depressed, as shown in Figure 20, against the resistance of the spring 272. Thus, a minimum amount of oil is allowed to exhaust from the cylinder 171 through the ports 245 and 248 in the sleeve 246 and the valve 247, respectively. Thus, the work is fed at a slow speed into the cutter. At the end of the feed stroke, the piston is reversed, as already described, the tip of the contact member 290 will have ridden slightly up on to the inclined surface $y$ of the cam 287 and in the reversal of the piston, the contact member 290 will be rocked about its pivot against the resistance of the spring 291 (Fig. 19) so that it assumes the position shown in Figure 21. This allows the tip surface of one of the ears 288 of the valve 247 to contact with the cam surface 280, the valve 247 being forced upwardly by the spring 272. Thus, the ports 245 are opened more fully, permitting the fluid to exhaust readily from the cylinder 171 and allowing the work head to withdraw at full speed. Thus, the withdrawal of the work head for indexing is accomplished at an accelerated speed.

When the work head is withdrawn from engagement with the cutter, the blank is indexed. The indexing mechanism and the means for actuating the same will now be described.

The index mechanism itself is of the notched plate type. It is shown particularly in Figures 35, 54 and 55. Keyed to the work spindle 138 is an index plate 300 and a ratchet wheel 301. The index plate 300 is provided with a number of notches equal to the number of teeth to be cut in the gear. The ratchet wheel 301 may be provided with any desired number of teeth.

Pivotally mounted at 302 on a guard or housing 303 that encloses the index mechanism is a lever arm 304. The housing 303 is secured to the work head 137 by bolts 305. The lever arm 304 carries a locking dog 306 which is adapted to engage successively with each of the notches of the index plate 300 to lock the index plate and the work spindle against rotation during cutting.

Rotatably mounted on a cylindrical bearing formed on the work head 137 concentric with the axis of the spindle 138 is a sleeve 307. Pivotally mounted at 308 on this sleeve is a pawl 309 that is constantly urged into engagement with the teeth of the ratchet wheel 301 by a coil spring 310. The pawl 309 is held out of engagement with the ratchet wheel 301 when the locking dog 306 is engaged with a notch of the index plate 300 by engagement of the cam surface 312 formed on the lever 304 with a roller 313 that is secured to the tail of the pawl 309. The locking dog 306 is constantly urged into engagement with the index plate by the coil spring 314.

Pivotally mounted, as at 316, on the lever arm 304 is a trip dog 315; this is held positively against movement in one direction but is free to move in the other direction against the resistance of the spring 317, which is connected at one end to this trip dog 315 and at its opposite end to the lever 304. Formed integral with the sleeve 307 is a trip block 318.

The sleeve 307 has formed integral with it a gear segment 320 which meshes with a rack 321 cut into the periphery of the piston 322 intermediate the ends of this piston.

This piston 322 reciprocates in a cylinder 323 formed integral with the index housing 303. One side wall of this cylinder 323 is slotted to permit mesh of the rack teeth 321 with the teeth of the segment 320. Piston rings are provided at both ends of the piston 322 to prevent leakage of the motive fluid along the piston.

It will be seen that when the piston is moved in the cylinder 323, the sleeve 307 will be rotated on its bearing. In the movement of this sleeve 307 in one direction, the block 318 will be brought into engagement with the trip dog 315, lifting the locking dog 306 out of engagement with the index plate 300. Immediately the pawl 309 will be engaged with the ratchet wheel 301 under actuation of the spring 310, so that the rotation of the sleeve 307 will be transmitted to the ratchet wheel 301, the index plate 300 and the work spindle 138, indexing the work spindle. During this movement, the locking dog 306 will ride on the periphery of the index plate 300 until it comes to the next notch in the index plate. It will then drop into that notch under actuation of the spring 314. As soon as the locking dog 306 returns into engagement with the index plate, the pawl 309 will be retracted from engagement with the ratchet wheel 301 because of contact of the cam surface 312 of the lever 304 with the roller 313 carried by the pawl 309. The indexing operation will now have been completed. The work head will be returned to cutting position through the means already described and the piston 322 will be reversed in the cylinder 323 returning the sleeve 307 to initial position shown in Figure 54. During this return movement, the block 318 will pass freely by the trip dog 315 rocking this dog about its pivot 316 without moving the lever 304.

The indexing mechanism is actuated in proper time with the movement of the work head through the mechanism now to be described. As previously stated, the control box 195 (Figs. 12 and 13) moves with the main piston 170 that controls the movement of the work head. As already described, there is a shaft 198 mounted in this control box which carries at one end the dog 200 which serves to control in one direction the length of stroke of the piston 170. Secured to this shaft 198 at its forward end is a stop dog 330. Secured to the control box 195 by screws 331 is an angle piece 332 and secured to this angle piece 332 is a stop bar 333.

The stops 330 and 333 engage alternately with the block 334 in the movement of the piston 170 back and forth. The block 334 is pinned to a rod 335 that is slidable in a housing 336. A coil spring 337 interposed between one face of the block 334 and one inner end wall of the housing 336 surrounds the rod 335 and serves to urge the block 334 and the rod 335 in one direction in the housing. A pair of nuts 338 which are secured to the rod 335 limit its movement in one direction. The movement of the block 334 and rod 335 is limited in the opposite direction by one side wall of that portion of the housing 336 which surrounds the opening through which the block 334 projects.

Figure 16:
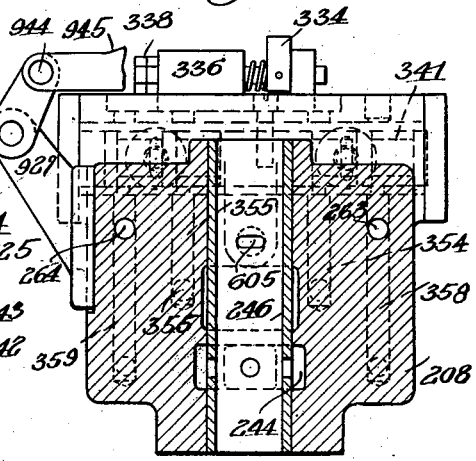
Figure 16 is a section on the line 16—16 of Figure 14, looking in the direction of the arrows, the speed control valve being removed for the sake of clearness in illustration.

The casting 208 (Figures 12, 14 and 15) has formed in it a valve chamber 340 which houses the index control valve 341. A bolt 342 which passes through a slot 343 in the wall surrounding the valve chamber 340 connects the housing 336 with the valve 341. Fluid under pressure is admitted to the valve chamber 340 alternately through the ports 350 and 351 (Figures 12 and 14) and the fluid is exhausted from the chamber 340 alternately through the ports 352 and 353. The ports 350 and 351 communicate, respectively, with the supply ducts 354 and 355 (Fig. 16) which communicate, respectively, with the pipes 356 and 357 (Figure 2). The ports 352 and 353 communicate, respectively, with the exhaust ducts 358 and 359 which are connected, respectively, with the pipes 265 and 266 (Figures 2 and 15) through which the exhaust fluid flows into the bore 255 whence it returns to the sump.

The chamber of the index control valve is connected by pipes 360 and 361 with the ducts 362 and 363, respectively, which communicate with opposite ends of the piston 322 (Fig. 54). In the position shown in Figures 12 and 14, the pipe 360 is on supply from the port 350 while the pipe 361 is on exhaust through the port 353. The piston 322 is moved, therefore, into the position shown in Figure 54, which is the locked up position of the index mechaism, namely, the position which the index mechanism occupies during the cutting of a tooth space in the blank.

When the cut has been completed, the work head is reversed through the mechanism already described and withdrawn away from the cutter. When the work head has moved clear of the cutter, the stop 330 which is carried by the control box 195 (Fig. 12) and which moves with the main piston 170 will strike the block 334 reversing the index control valve 341. This will put the pipe 360 on exhaust and the pipe 361 on supply, moving the piston 322 in the cylinder 323 and actuating the index mechanism to index the blank. When this movement has been completed, the piston 170 is reversed, reversing the direction of movement of the work head and the direction of movement of the control box 195. In the return movement of the work head, the bar 333 strikes the block 334 again reversing the index valve 341 to return it to the position shown in Figures 12 and 14 to return the sleeve 307 to initial position shown in Figure 54.

It will be noted that it is not necessary to make any adjustments for the travel of the piston 322 for cutting gears of different numbers of teeth. The piston stroke is constant for all numbers of teeth. All that is required for gears of different numbers of teeth is a different index plate.

The block 334 is resiliently urged in one direction by the spring 337 in order to insure that the locking dog will have properly seated before the sleeve 307 reverses to return to initial position and before the next cut is taken on the blank.

The alternate feeding and withdrawal motions of the work head proceed within the limits of motion set by the stops 200 and 203 until the desired number of teeth have been cut in the blank G. Then the automatic control mechanism housed within the control box 195 operates to rock the stop 200 out of the way of the trip member 204 (Fig. 18), allowing the piston 170 to continue the direction of its movement until it bottoms in the cylinder 171. Thus, the work head and with it the completed gear is carried an extended distance away from the cutter to loading position.

The control mechanism will now be described. Journaled in the box 195 (Figs. 12 and 13) is a shaft 400 to one end of which is secured a ratchet wheel 401. Mounted for sliding movement in guide-ways formed in the back-plate 403 of the housing 195 is a block 404. Pivotally mounted on this block 404, as at 405 and 406, respectively, are two pawls 407 and 408. These pawls are adapted to engage the ratchet wheel 401 as clearly shown in Figure 12. 410 designates a plunger which passes through the side wall of the housing 195 and the lug 411 formed on this housing and the head 412 of which is adapted to engage one end of the block 404.

Journaled in the control box 195 (Figures 13 and 20) and in a lug 415 which is secured by screws 416 to the cylinder 171 is a rod 417. This rod 417 carries at one end a trip member 418 which is of the shape clearly shown in Figures 24 to 26 inclusive.

As the piston 170 moves to the left in Figures 12 and 20 carrying with it the control box 195, the plunger 410 strikes the trip 418. This occurs before the piston has reached the limit of its travel in this direction, namely, before the trip 204 (Fig. 18) strikes the stop 200. When the plunger 410 strikes the trip 418 it will move the block 404 against the resistance of the spring 420 (Figures 12 and 13), thus causing the pawls 407 and 408 to move the ratchet wheel 401.

The stop 418 is yieldably mounted on the rod 417 to permit of the continued movement of the piston 170 to the limit of its movement, as determined by the position of the stop 200, without causing breakage of the parts. This yieldable connection is through the spring 422 which is housed in a recess bored in the trip 418 (see Fig. 24) and which is interposed between the trip member 418 and a cap-piece 423 which is pinned to the rod 417. This cap piece 423 is formed with tips 424 (Figs. 20 and 24) that engage in slots 425 formed in the trip 418 to hold the trip 418 against rotation relative to the rod 417.

On each withdrawal stroke of the work head, then, the plunger 410 strikes the trip member 418 to cause the pawls 407 and 408 to ratchet the ratchet wheel 401 a tooth or more forward, accordingly as the pawls are adjusted.

Secured to a sleeve 428 (Figures 12 and 13) that is rotatable on the shaft 400 is a trip dog 429. This trip dog 429 is secured to the sleeve 428 by the set-screw 430. As clearly shown in Figure 13, the sleeve 428 is provided on its front end with clutch teeth. These clutch teeth are adapted to be engaged by corresponding clutch teeth formed on the rear face of a clutch member 431 which is keyed to the shaft 400. The opposed clutch teeth are brought into engagement by threading up on the nut 432 which threads on to the end of the shaft 400. Secured to the sleeve 428, as by a set-screw 434 is an indicator dial 435. This indicator dial, as clearly shown in Figure 20, is graduated in number of teeth to be cut in the blank. It is read against a zero mark on the front wall of the housing 195.

By unthreading the nut 432 to disengage the clutch 431 from the sleeve 428, the dial 435 can be rotated to adjust the sleeve 428 and the trip dog 429 carried thereby angularly on the shaft 400. Thus the control mechanism can be set to govern the number of teeth to be cut in the blank.

When the clutch member 431 is engaged again with the sleeve 428, the trip dog 429 will move with the shaft 400 and with the ratchet wheel 401 which is secured to that shaft. On each stroke of the piston 170, the ratchet wheel 401 will be moved a tooth's distance by the pawls 407 and 408 as already described. When the work head is moving to indexing position after the next to the last tooth space has been cut in the blank, the trip dog 429 will have been moved by rotation of the ratchet wheel 401 to the position shown in Figure 12 where it engages a lug 438 (Figures 12, 13 and 19) that is secured to the shaft 198. The dog 429 will thus rock the shaft 198 counterclockwise, rocking the stop 200 out of line with the trip 204 (Fig. 18) and the stop 330 out of line with the block 334. Thus, on the succeeding withdrawal motion of the work head, the trip member 204 is not reversed and the piston 170 is allowed to continue its movement in the cylinder 171 until it bottoms in that cylinder. Likewise on this last outward movement of the work head, the trip 330 does not reverse, the index control valve (Fig. 12) is not reversed and consequently the work head travels out to loading position with the index piston 322 (Fig. 54) in the position shown in Fig. 54. A link 450 is pivotally connected to the pawl 408 (Fig. 12) by the screw 451 and is connected to the pawl 407 by the screw 452 which passes through a slot formed in the notch 450. As the piston and work head move to loading position, the rod 450 strikes a block 454 (Fig. 20) which is pinned to the rod 417. This causes the link 450 to disengage the pawls 407 and 408 from the ratchet wheel 401 which is returned to initial position by means of the coil spring 455 (Figure 13). This spring 455 is pinned at one end to the ratchet wheel and at its other end to a plate 456 which is fastened to the bearing formed on the housing 195 for the shaft 400. Thus the ratchet wheel is reset so that when the work head is returned to cutting position with a new blank positioned thereon, the same number of teeth will be cut in this new blank.

It is to be noted that during the alternate cutting and indexing, the ratchet wheel 401 is ratcheted forward by engagement of the plunger 410 with the trip 418 as described and that when the piston 170 reverses carrying the plunger 410 away from the trip 418, the spring 420 (Figs. 12 and 13) acts to reset the pawls 407 and 408 ready for the next actuation by the plunger 410.

When the work head has been moved to the loading position, the chuck is released, the completed gear is ejected from the work spindle and a new blank is taken from the magazine, positioned on the work spindle and chucked and then the work head is returned to operative position for the cutting of this new blank.

There is a magazine mounted on each work head. The magazine comprises in each case a tubular member 500 and a casting 501 in which this tubular member is held by the set screw 502. The blanks are stacked on top of one another in the tubular member as clearly shown in Figures 2 and 28 to 31 inclusive. Mounted for pivotal movement in the casting 501 is a block 503. This block 503 is formed on one face with a pocket 505 which is adapted to receive the lowermost of the blanks in the tubular member in the position shown in Figure 28. When rotated the block 503 drops this blank into the pocket 507 formed in the casting 501, as shown in Figure 29. The front of the casting 501 and of the pocket 507 formed therein are open and a pair of gate members 509 are provided to close these openings. These gate members 509 are pivoted at one end of the stud 510 that is threaded into the casting 501. At their lower ends, as at 511, these gate members 509 are notched to engage a stud 512 which is threaded into the casting 501 below the pocket 507. The gate members are formed to provide an oval-shaped opening above the studs 512 when the gate members are shut as shown in Figure 31. A spring 515 which is connected at its opposite ends to the two gate members 509 serves to constrain the gate members into closed position. Secured to the work head 137 as by screws 520 and bolts 521 is a casting 523. Reciprocably and oscillatably mounted in this casting is a cylindrical bar 525. Clamped to this bar 525, as by means of the bolts 526 is a transfer arm 527.

This arm 527 is formed at its outer end with an enlarged head 530 which is recessed to provide a pocket for the split bushing or collet 531. Pinned to the collet 531 is a rod 532 and surrounding the rod 532 and interposed between the bushing 531 and the inner end wall of the recess formed in the head 530 is a coil spring 534. This coil spring serves to urge the bushing 531 outwardly into the position shown in Figure 28. The outward movement of the bushing is limited by the nuts 535 which are threaded onto the rod 532.

Secured to the transfer arm 527 at one side of the head 530 is a member 538 (Figs. 28 and 32) which is provided at its inner end with a beveled nose, as clearly shown in Figure 32. This member 538 is secured to the arm 527 by a nut 539 which is threaded onto a stud 540 threaded into the transfer arm 527. Formed on the transfer arm 527 on the same side to which the stud 540 is secured is a stud 542 (Figs. 29 to 32 inclusive).

The bar 525 is recessed at a point intermediate its length (Figures 30, 31 and 35 to 39 inclusive) and in this recess is mounted a dog 545. This dog 545 is urged outwardly to the position shown in these figures by means of a spring 546 which is interposed between the dog and the inner end wall of the recess in the bar 525. A pin 547 which engages in a slot 548 in the side of the dog 545 serves to limit the movement of this dog.

The purposes of the beveled member 538, the stud 540, the stud 542 and dog 545 will appear hereinafter.

Extending around the tubular member 500 and pivotally mounted at 550 on the casting 523 is a forked arm 551, (Figs. 28 to 32 inclusive). Surrounding the lower end of the tubular member 500 and slidably mounted thereon is a sleeve 553. Pivotally mounted in this sleeve at equal distances apart are three gripping fingers 554.

The tubular member 500 is slotted at three spaced points around its periphery, one of these slots being shown at 555 in Figures 28 and 29. The gripping fingers 554 are adapted to extend through T-slots 555 in the tubular member. The upper ends of these slots 555 are beveled as indicated at 556 to provide a camming surface against which the tails of the fingers 554 are held by the weight of the fingers themselves. The arm 551 is provided at diametrically opposed points with studs 560 (Figs. 28 and 29 and 31) which engage in elongated slots 561 formed at diametrically opposed points in the sleeve 553.

Figure 29 shows in full lines the lowermost position of the arm 551. When this arm 551 is rocked about its pivots 550 to the dotted line position shown in this figure (the full line position of Figure 28), the studs 560 by their engagement with the slots 561 lift the sleeve 553 upwardly on the tubular member 500, thus camming the gripping fingers 554 from the position indicated in Figure 29 to the position shown in Figure 28, in which latter position they engage one of the gear blanks in the magazine to lift the column of blanks upwardly taking their weight off of the rocking block 503.

Connected to the rocking member 503 to move therewith and to rock the same is a crank arm 565 (Figures 28, 29, and 31). At one end this crank arm 565 carries a roller 566. Connected to its other end as by means of a pin 567 is a coil spring 568, the opposite end of which is connected by a spring 569 to the casting 523. The spring 568 urges the arm 565 and the block 503 therewith into the position shown in Figure 29.

Slidably mounted in a lug 570 formed on the casting 523 is a rod 571 (Figures 28, 29 and 31). This rod 571 is provided with a notch or slot at 572 and with an elongated slot 573. A pin 574 that is secured in the casting 523 engages in the slot 573, limiting the movement of the rod 571 in both directions.

Figures 28 and 30 show the positions of the parts during cutting. The transfer arm 527 is in the angular position shown in Figure 30 with the head 530 of this arm registering with the pocket 507 of the magazine. The gate members 509 are swung open by entry of the taper member 538 between these two members. The adjacent side edges of these two members 509 are beveled as indicated at 567 in Figure 31 to permit the taper member 538 to move readily into position between the gate members 509. With the gate members swung open, the spring 534 forces the split bushing or collet 531 into the bore of the blank in the pocket 507. Thus the blank in the pocket 507 is gripped ready for movement with the transfer arm. The stud 540 is engaged with the arm 551 so that this arm is rocked to its upper position, causing the sleeve 553 to be lifted upwardly on the tubular member 500 and thereby causing the tails of the gripping fingers 554 to be cammed outwardly, forcing the gripping fingers inwardly to engage one of the stack of blanks in the magazine and lift the weight of the stack off of the lowermost gear which is seated in the pocket 505 of the block 503. At this time, the block 503 is held against movement under actuation of the spring 556 by engagement of the bar 571 with the roller 566 which is carried by the crank arm 565. At this time, also, the stud 542 on the transfer arm will be in engagement with the notch 572 formed in the rod 571. At this time, also, the catch or dog 545 will be behind the stripper plate 582 in the position shown in Figures 35 and 38.

When the work head has been moved to loading position by the mechanism already described, the loading mechanism is put into operation. The first movement of the bar 525 is outwardly, that is, to the left from the position shown in Figures 28 and 35. This moves the transfer arm 527 outwardly, also, that is, to the left from the position shown in Figures 28 and 35. The stripper plate 582 is secured to the nose-piece 152 by a set screw 585. So, as the bar 525 moves outwardly, the stripper plate 582 is carried with it by engagement of the catch 545 with this stripper plate. This movement of the stripper plate 582 is against the resistance of the spring 586 which is secured at one end to a rod 587 and at its opposite end to the work head 137, the rod 587 being secured to the stripper plate 582 by the nut 588. As the bar 525 moves outwardly, then, the stripper plate 582 moves with it, carrying the nose 152 with it. As the blank will have been previously released by collapsing the collet 141 through the mechanism hereinafter to be described, when the stripper plate 582 moves outwardly the completed gear will be stripped or ejected from the work spindle. The limit of the outward movement of the stripper plate is shown in Figure 36.

During this same outward movement of the bar 525 the transfer arm 527 will carry with it the blank which has previously been positioned in the pocket 507. It will also carry with it the bar 571 through engagement of the stud 542 with the notch 572 in this rod 571. The gate members 509 will be held open by the wedge member 538 until the gear blank on the transfer arm has cleared these gate members. Then the gate members will snap closed under actuation of the spring 515.

As the rod 571 moves outwardly, the roller 566 will follow it under actuation of the spring 568, thus rocking the block 503 about its axis and dumping the blank which has been in the pocket 505 in this block into the pocket 507 in the casting 501. During the whole of the outward movement of the rod 571, the weight of the column of blanks in the magazine will be kept off of the block 503 by engagement of the stud 540 with the arm 551 thus the spring 568 will be capable of rocking the block 503.

When the stud 540 has moved clear of the arm 551, this arm drops about its pivot 550 into the position shown in Figures 29 and 31, letting the sleeve 553 drop onto the top of the casting 523, camming the fingers 554 out of engagement with the stack of blanks and allowing the whole stack to rest on the block 503.

As soon as the stud 540 clears the arm 551, the bar 525 is rotated clockwise to swing the transfer arm 527 from the position shown in Figures 28 and 30 to the position shown in Figures 29 and 31 in full lines. In this movement, the catch 545 moves into alignment with the slot 590 formed in the stripper 582 (Figs. 30, 31 and 35 to 39 inclusive). Immediately the stripper 582 is retracted by the action of the spring 586. In this movement, also, the stud 542 is withdrawn from engagement with the notch 572 in the rod 571, but this rod remains in the position shown in Figure 29 because the roller 566 on the crank arm 565 is pressing against the end of this rod under actuation of the spring 568.

When the arm 527 has moved into position to align the blank with the work spindle, the bar 525 is moved inwardly carrying the new work piece onto the work spindle. This position is shown in Figure 29. The collet 531 is forced out of the bore of the blank by engagement of the tips of the collet fingers with the nose of the tapered expander 142 and the clamping arbor 141. In this movement, the catch 545 passes through the opening 590 in the stripper arm 582.

As soon as the blank is on the work spindle, the chucking mechanism operates to securely clamp it thereon.

When the blank has been clamped on the work spindle, the bar 525 is reversed and again moved outwardly. In this movement, the catch 545 passes through the slot 590 in the stripper 582.

When the transfer arm 527 has moved outwardly a sufficient distance, the bar 525 is rotated back counterclockwise to return the collet 531 into alignment with the pocket 507 in the casting 501. In this movement, the stud 542 again enters into engagement with the notch 572 of the rod 571 and the stud 540 engages and lifts up the arm 551. As the arm 551 is lifted upwardly it lifts the sleeve 553 with it, camming the fingers 554 into engagement with one of the blanks in the magazine and lifting all of these except the lowermost one off of the block 503.

The bar 525 is again moved inwardly. During this movement, the stud 540 continues in engagement with the arm 551 keeping the weight of the blanks off of the block 503. During this movement, also, the bar 571 moves inwardly through engagement of the stud 542 therewith. Thus the block 503 is rocked backward against the resistance of the spring 568 into the position shown in Figure 28. When this block 503 has been rocked backward far enough, the lowermost blank which has been riding on the periphery of the block drops into the pocket 505, namely, into the position shown in Figure 28. In this inward movement of the bar 525, the wedge member 538 engages the beveled surfaces 580 formed on the gate members 509 and opens the gate members. The collet 531 then enters the bore of the blank in the pocket 507, clamping that blank ready to carry it to the work spindle in the next loading cycle.

As the bar 525 moves inwardly, also, the catch 545 (Figures 35 to 39 inclusive) slips over the edge of the bore in the stripper 582 because its rear face 592 is beveled. The catch 545 thus gets behind the stripper bar 582 in the position shown in Figure 38 ready to move the stripper bar outwardly to strip a completed gear when the transfer arm moves outwardly on the next loading cycle.

The mechanism for operating the loading mechanism will now be described. Mounted in the work head is a transposing valve 600 (Figures 28, 35, 33 and 53). During the cutting operation, this valve 600 is held in the position shown in Figure 53 by the spring 601. This valve is connected by the line 602 (see also Fig. 2) with the duct 604 (Figure 15) which leads into a port 605 formed in the sleeve of the throttle valve 247. A line 607 leads from the chamber 608 of the transposing valve to the bore 363 in the index guard (Figures 54 and 55). A second line 609 communicates with a duct 610 formed in the index guard casting parallel to the duct 363. The duct 363 runs the full length of the cylinder 323. The duct 610 runs only part-way the length of this cylinder. Another line 612 leads from the valve chamber 608 into a chamber 614 (Figures 55 and 56) which is normally closed by the ball valve 615 which is held in closed position by the coil spring 616. The chamber 616 communicates with the cylinder 323 through the duct 617.

Mounted in the work head for simultaneous reciprocation in opposite directions are a pair of cylinders 620 and 621 (Figures 28, 32 and 33). A duct 622 (Fig. 53) connects the transposing valve chamber 608 with the lower end of the chamber 624 in which the piston 621 reciprocates.

The cylinders 620 and 621 are provided on their opposed faces with rack teeth, 625 and 626, respectively. The opposed faces of the walls of the cylinders 624 and 628 are cut away to allow these rack sections to mesh with a spur pinion 629 that is mounted on a shaft 630 to which is secured the drum type valve 632 that governs the loading operation, (Figures 44 to 52 inclusive).

This drum valve rotates in a sleeve 633 mounted in a suitable opening in the work head (Fig. 28).

A duct 635 leads from the chamber of the transposing valve to the port 636 in the sleeve 633. A duct 637 leads from the chamber 608 of the transposing valve and branches at 638 (Fig. 28). The main line 637 communicates with the bore 639 formed in the sleeve 633 (Fig. 49). The branch line 638 communicates with a similar port 640 (Fig. 28) formed in the sleeve 633.

In the position of the piston 322 shown in Figure 54, the line 360 is on supply and the line 361 is on exhaust. The pressure fluid can flow through the opening 645 into the line 610, thence through the line 609 into the chamber 608 (Figure 53) of the transposing valve. In the position shown in Figure 53, however, the line 609 is a dead end for all other ports are closed off by the transposing valve 600. The position of the transposing valve shown in Figure 53 is the position that it occupies while the blank is being cut so that although the index mechanism is actuated once in each cycle of cutting and indexing, as the piston 322 occupies the position shown in Figure 54, no pressure fluid can flow to the loading valve 632 (Fig. 45) or to the pistons 620 and 621 which rotate this valve.

When the trips 330 and 200 (Figs. 20 and 18) are tripped out of the way by operation of the control device 195, the work head moves full out to loading position as described above. In this movement, the nose of the contact member 290 passes from the part x of the cam 287 up the inclined surface z. The tips of the ears 288 will then engage the surface of the cam 286. Then the ears 288 will ride off of this cam surface 286 entirely and under actuation of the spring 272 the throttle valve will assume the position shown in Figure 22.

In this position, the pressure fluid flows from the line 225 into the valve chamber through the opening 650 in the sleeve 246, thence through the port 605 (Fig. 15), the duct 604 and the line 602 forcing the transposing valve 600 (Fig. 53) to the left against the resistance of the spring 601. The various lines leading from the valve chamber 608 are now opened. The pressure fluid flows from the line 609 which is connected with the index cylinder 323 (Fig. 54) through the chamber 608 into the duct 635 that delivers the pressure fluid through the opening 636 in the valve casing 633 (Fig. 47). At the same time, fluid is exhausted from the valve casing through the openings 639 and 640 (Figs. 49 and 28) into the line 607 thence to the duct 363 back through the line 361, the valve chamber 340 (Fig. 14), the line 359 (Fig. 16), and the line 266 (Figs. 2 and 15) to the sump.

The pressure fluid flows, also, from the line 609 into the line 622 (Fig. 53) which delivers it at the lower end of the piston 621 (Figs. 32 and 33). A part of the fluid entering the line 622 by-passes through the line 612 (Fig. 53), the ball-valve 615 (Figs. 55 and 56), the chamber 614 and the duct 617 into the chamber of the cylinder 323 (Fig. 54) from whence the pressure fluid is being delivered to the transposing valve chamber 608.

Through a line 655 clearly shown in the diagram Figure 57, the pressure fluid flows from the line 612 to the upper end of the piston 620. Thus, pressure fluid is delivered simultaneously to the opposite ends of the pistons 620 and 621, moving these pistons in opposite directions and rotating the shaft 630. Through the lines 656 and 657, clearly shown in Figure 57, the fluid exhausts from the cylinders 624 and 628. The line 657 is connected with the chamber 658 (Figs. 34) of a needle valve. This valve includes the needle member 660 which threads into the bottom of the valve chamber and which can be adjusted and locked by the nut 661. Mounted in the valve chamber above the needle member 660 is a valve member 662 that is pressed into a suitable seat in the valve chamber by a coil spring 663. The point of the needle member 660 enters into an opening 665 which runs through the valve member 662. By adjusting the needle member 660, the area of the opening about the needle point can be controlled. This needle valve is employed to adjust the rate of flow of the exhaust fluid from the cylinders 628 and 624, thereby controlling the speed of rotation of the shaft 630 and the speed of operation of the loading mechanism.

For releasing the spring chuck, hydraulically operated means is employed. Threaded into the end of the cylinder 700 (Fig. 35) which houses the spring 150 is a cap member 701. This cap member 701 is provided at its inner end with a seat for the mushroom-headed member 702.

This mushroom-headed member 702 is provided with a seat for the ball 703. The spring 150 serves to force the draw bar 145 rearwardly in the work spindle 138 and hold the tip of the bolt 146 in contact with the ball 703. In the position shown in Figure 35, the mushroom-headed member 702 is in alignment with the draw bar 145 and the parts of the chucking mechanism are in chucking position. When the mushroom-headed member 702 is rocked from alignment with the draw-bar, the bolts 146 and the draw bar are forced forward against the resistance of the spring 150. This moves the draw-rod 144 with the tapered expander 142 forward in the bore of the collet 141 to the position shown in Figure 36, thus releasing the collet and unclamping the blank.

The mushroom-headed member 702 is rocked by a link 705 which is connected at one end to the mushroom headed member 702 and at its opposite end to a lever arm 706 which is pivotally mounted at 707 on an ear 708 of a combined sleeve and cylinder member 710. A set screw 711 that engages in an arcuate slot in the periphery of the cylinder 700 serves to hold the casting 710 against longitudinal movement on the cylinder 700. A pin 712 which is threaded into the casting 710 and engages in an opening formed in the index housing 303 serves to hold the casting 710 against rotation in the indexing movement of the work spindle. The casting 710 serves as a cylinder in which the piston 714 is movable. This piston contacts at its upper end with the tip of the lever arm 706. Fluid pressure is admitted into the chamber 710 to force the piston 714 upwardly to rock the mushroom headed member 702 and release the blank, while the spring 150 acts to return the piston 714 to the position shown in Figure 35 when the pressure of the fluid on the lower end of the piston is removed. The pressure fluid is delivered to the chamber 710 through the line 720 and is exhausted through this same line.

The line 720 connects with a three-way valve 721 (Figs. 2 and 28). This valve is also connected by the line 723 with the pipe 360 which connects the index control valve with the indexing cylinder (Fig. 2). A third line 724, shown most clearly in the diagram (Fig. 57) connects the valve 721 with the port 726 (Fig. 52) of the sleeve 633 which forms a chamber for the loading valve 632.

When the work head moves to loading position, it permits the throttle valve 247 to open full, as shown in Figure 22. This permits the pressure fluid to flow through the line 602, as above described, opening the transposing valve 600 (Fig. 53). This sends a supply of fluid to the loading valve 632 through the line 635 and port 636 (Figs. 53 and 47), as already described. At the same time, through the lines 622 and 655 (Fig. 57) the pressure fluid flows to opposite ends of the cylinders 620 and 621, moving the cylinders in opposite directions as above described, and rotating the pinion 629 and the shaft 630 to which the loader valve 632 is connected.

This rotation of the loader valve 632 is clockwise, looking at Figures 47 to 53 inclusive. In these figures, the stippled portion indicates the pressure fluid and the clean portions, the exhaust fluid. The pressure fluid is flowing through the duct 636 in the sleeve 633 into the opening 750 formed in the valve 632 (Fig. 47) thence through the bore 752 drilled longitudinally of the valve. It flows out of this bore 752 through the opening 753 into the valve chamber.

In the rotation of the valve 632 clockwise, the port 726 is first opened to supply. The supply flows through the line 724 into the line 720 (Figs. 6, 7 and 2) thence into the chamber of the casting 710 forcing the piston 714 upwardly (Fig. 35) and releasing the chuck. The first operation, therefore, in the rotation of the valve 632 is to release the chucking mechanism and thus release the blank.

In the position shown in Figures 48 and 50, the port 760 in the loader valve casing is connected through a suitable duct with the port 762 (Fig. 32) of a cylinder 764 which houses the transfer piston 765 (Figs. 32 and 33). The port 766 of the loader valve casing is connected with the port 767 of the cylinder 764. In this position of the loader valve 632, the port 762 is on exhaust and the port 767 is on supply. The piston 765 is, therefore, held in the position shown in Figures 32 and 33. This is the position which the piston occupies during cutting.

The piston 765 is provided at one side with rack teeth 769 and the adjacent side wall of the cylinder 764 is open to permit these teeth to mesh with the teeth of a pinion 770 that is rotatably mounted on a stud 771 which is threaded into the casting 723. This pinion 770 meshes at a point diametrically opposite the point of its mesh with rack 769 with rack teeth 772 cut into the bar 525. In the position shown in Figure 32, then, the bar 525 is held retracted, the position it occupies during cutting, with the loader arm 527 at the magazine as shown in Figures 28 and 30.

As the loader valve 632 rotates, the ports 766 and 767 are put on exhaust and the ports 760 and 762 on supply. This causes the piston 765 to move to the right in the cylinder 764 from the position shown in Figure 32. Through the geared connection 769, 770 and 772, this causes the bar 525 to move outwardly carrying the transfer arm 527 with it as described hereinbefore.

In the position shown in Figure 51, the port 775 is on supply from the opening 776 in the valve 632, which opening communicates with the bore 752. The port 775 communicates with a port 777 (Figs. 32 and 33) that opens into a cylinder 778 housing a piston 779. The port 780 at the opposite end of this cylinder 778 communicates with the port 781 in the casing 633 of the loader valve 632. Thus, in the position shown in Figure 51, the port 775 is on supply and the port 780 on exhaust.

The piston 779 has rack teeth 785 cut into one side of its periphery and these teeth mesh with teeth 786 cut part way around the periphery of the bar 525. The position shown in Figures 32 and 33 is the position which the parts occupy during cutting with the bar 525 rotated to the limit of its movement clockwise (looking at Fig. 33), with the transfer arm swung up into alignment with the pocket 507 of the magazine, as shown in Figures 28 and 30.

In the further rotation of the valve 632, that is, after the transfer bar 525 and arm 527 have moved outwardly clear of the arm 551, as already described, the ports 775 and 777 are put on exhaust and the ports 780 and 781 on supply. The piston 779 then moves to the right from the position shown in Figure 33, rotating the part 525 and swinging the transfer arm down into alignment with the work spindle.

In the further rotation of the valve 632, the port 766 in the valve casing (Fig. 50) again goes on supply through the opening 790 in the valve which communicates with the bore 752. At the same time the port 760 goes onto exhaust again through the opening 791 which communicates with the slot 792 cut in the periphery of the valve (Figs. 49, 56 and 46). Thus, the piston 765 is again moved to the left in the cylinder 764 (see Fig. 32). This movement, through the gearing 769, 770 and 772 carries the bar 525 inwardly and with it the loader arm 527, positioning the new blank on the work spindle, as shown in Figures 29 and 31.

With the blank positioned on the work spindle, the next operation is to chuck it. This is accomplished in the further rotation of the valve 632 by putting the port 726 (Fig. 52) again on exhaust, thus draining the oil from the cylinder 710 (Fig. 35) and allowing the parts of the chucking mechanism to resume chucking position under actuation of the spring 150, as shown in Figure 35. In the further rotation of the valve 632, the port 760 (Fig. 48) is again put on supply to the opening 793 in the valve which communicates with the bore 752. At the same time, the port 760 goes on to exhaust through the opening 795 (Fig. 50) which opens in to the slot 792 cut into the periphery of the valve, (Figs. 45 and 46). Thus, the port 762 is again put on supply and the port 767 on exhaust. This moves the piston 765 to the right again (see Fig. 32) moving the bar 525 and transfer arm 527 outwardly away from the newly chucked blank.

When this outward movement has proceeded to the desired extent, the port 775 (Fig. 51) again goes on to supply and the port 781 on exhaust.

This puts the port 777 of the cylinder 778 (Figs. 32 and 33) on supply and the port 780 on exhaust. Thus, the piston 779 is moved to the left, rocking the bar 525 to the position shown in Figures 32 and 33 and swinging the transfer arm back into alignment with the pocket 507 in the magazine. It will be noted that when the piston 779 has moved full to the left, as shown in Figure 33, it opens up a port 797 which communicates with a pipe 798 that leads to the safety valve chamber port 799 (Figs. 40 and 41).

The final movement of the transfer arm 527 is inwardly to return the arm to the magazine and force the collet 531 (Fig. 28) into engagement with the new blank in the pocket 507 of the magazine. This inward movement of the bar 525 and transfer arm 527 is accomplished in the further rotation of the valve 632 when the port 760 in the valve casing (Fig. 48) again goes on exhaust through the opening 800 which opens into the slot 792 cut in the periphery of the valve. At this same time, the port 76 is again put on supply through the opening 801 which communicates with the bore 752 of the valve. Thus, the port 762 is again put on exhaust and the port 767 on supply (Fig. 32). Thus the piston 765 is moved to the left to the position shown in Figure 32 returning the transfer arm 527 to the position shown in Figures 28, 30 and 32. This completes the loading cycle, which takes place in a single revolution of the loader valve 632 under actuation of the pistons 620 and 621 (Figs. 32 and 33).

As above described, when the piston 779 moves to the left to the position shown in Figures 32 and 33, which is its final position in the loading cycle, it opens up the port 797, allowing the motive fluid to flow through the line 798 to the safety valve. This valve and its operation will now be described.

805 (Figs. 40 and 41) designates the casting which is bored to provide the chamber 806 for the valve. This casting 805 is secured in any suitable manner to the upper face of the index housing 303 (Fig. 2). The valve itself is designated at 807. A spring 808 which is housed in a recess formed in the valve and which is interposed between the end wall of this recess and the inner end wall of the valve chamber acts to urge the valve outwardly of the chamber. When the valve is free to move outwardly, its outward movement is limited by the nuts 810 which are adjustably threaded on the rod 811 which is threaded into the valve 807.

Secured to the valve 807 at its front end, as by means of a screw 812 is a bar 813. Secured to this bar 813, as by means of the setscrew 814 is a rod 815. This rod 815 moves in a recess 816 formed in the casting 805.

The valve 807 is held in its innermost position, shown in Figure 41, against the resistance of the spring 808 during cutting. It is so held by the catch 818 which is formed on the end of the long arm of a bell-crank lever 819 that is pivoted at 820 on the casting 805.

The catch 818 engages with the bar 813, as shown in Figure 41.

Secured to the inner end of the bar 525, which carries the transfer arm 527 is an arm 842 (Figs. 42 and 43).

When the transfer arm 527 is at the magazine, the position it occupies during cutting as shown in Figures 28 and 30, the arm 842 at the other end of the bar 525 will be in the full line position shown in Figures 42 and 43, with its rear face in contact with the rod 815, cooperating with the catch 818 to hold the valve 807 in the position shown in Figure 41.

When the work head has been moved to loading position, the loading mechanism is put into operation as already described. The first movement of the bar 525 is outwardly to carry the transfer arm 527 free of the magazine and the stud 540 (Figs. 28 and 29) to the limit of its outward movement. In this movement of the bar 525, the arm 842 moves outwardly to a position such as indicated by the dotted lines 842' in Figure 42. Next, the bar 525 is rotated to swing the transfer arm 527 into alignment with the work spindle. In this rotation of the bar 525, the arm 842 is swung angularly to the dotted line position 842'' shown in Figure 43. This brings the arm 842 into alignment with a rod 843 which is adjustably threaded into a plunger 844. The plunger 844 is slidable in lugs 845 and 846 formed on the casting 805. It is adapted to contact at its inner end with the short arm of the bell-crank lever 819. The movement of the plunger is limited by a pin 847 which is secured in the lug 846 and which engages in a slot 848 formed in the plunger 844.

In the next movement of the loading mechanism, the bar 525 is carried inwardly to push the blank onto the work spindle. In this movement, the arm 842 pushes the rod 843 and plunger 804 rearwardly, causing the plunger 844 to come into contact with the short arm of the bell-crank lever and rock this lever about its pivot 820, releasing the catch 818 against the resistance of the spring 850 and allowing the valve 807 to move outwardly under actuation of the spring 808. The spring 850 referred to is interposed between the long arm of the lever 819 and the inner wall of a recess formed in the lug 845. The valve, therefore, assumes the position shown in Figure 40.

Figure 14:
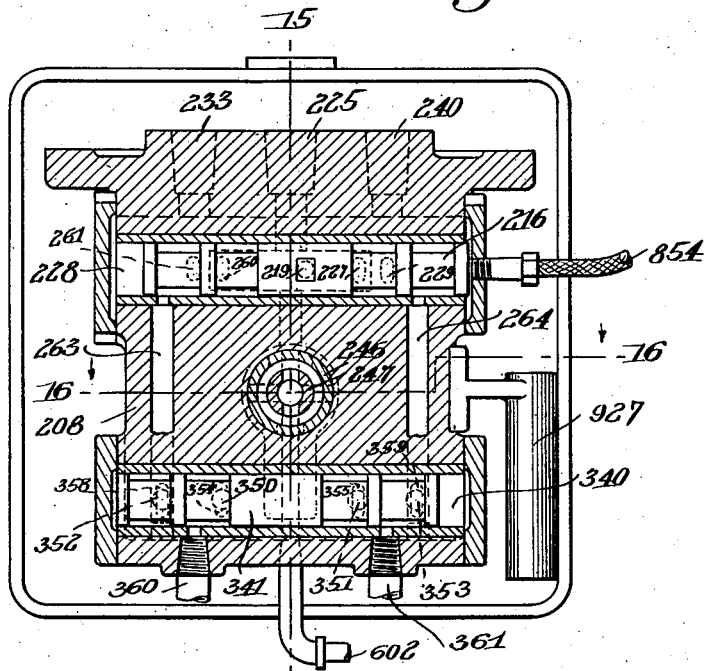
Figure 14 is a plan sectional view through one of the control valve housings, taken substantially on the line 14—14 of Figure 15. One of these housings is provided for each work head.

There is a port 852 in the chamber 806 of the safety valve. This port 852 communicates with a duct 853 that leads to a line 854 (Figures 42 and 2). The line 854 leads at its lower end into the chamber 228 of the auxiliary reverse valve 216 (Figures 14 and 18). The positions of the reverse valve 216 and the main reverse valve 215, shown in Figures 14 and 18, are the positions these parts occupy when the work head is at the loading position with the main piston 170 bottomed in the cylinder 171. In the position shown in Figure 40, the line 854 is open to supply from the line 798 which is connected, as already described, with the cylinder 778 (Fig. 33).

It is not, however, until the bar 525 has moved outwardly from the work spindle and been swung to the full extent of its movement back into alignment with the pocket 507 in the magazine that the port 797, which leads into the line 798, is opened to supply. But during the last inward movement of the bar 525 and transfer arm 527, which carries the transfer arm up to the magazine, the port 797 is open to supply. During this time, therefore, the motive fluid flows through the line 798 into the port 799, out of the port 852, into the line 854 to the valve chamber 228, forcing the valve 216 to the left from the position shown in Figure 14, reversing the valve 215, allowing the motive fluid to flow into the end of the main piston 170 which has previously been bottomed in the cylinder 171 and thus returning the work head to operating position. In the return of the work head to operating position, the stops 200 and 330 (Figs. 12, 18 and 19) ride freely over the trips 204 and 334, respectively, their movement being limited only by the pin 898 which is secured in the plate 188 and which engages a lug 899 formed on the tail of the stop 200.

It is to be noted that in the final inward movement of the transfer bar 525, the arm 842, which is again in the full line position shown in Figure 43 moves into contact with the rod 815, forcing this rod, the bar 813 and the valve 807 rearwardly against the resistance of the spring 808, so that the catch 818 again slips over the end of the bar 813 and locks the valve 807 in the position shown in Figure 41. This shuts off the supply through the line 854 to the auxiliary valve chamber 228, but before this occurs, the work head will have moved inwardly toward the cutter far enough to resume its cycle of alternate cutting and indexing.

From the operation of the safety valve, it will be noted that this valve is opened to supply when the transfer arm 527 has been swung into alignment with the work spindle, but that the supply cannot flow to this safety valve until the transfer arm 527 has been swung back again into alignment with the magazine pocket 507, when the piston 779 in its movement has opened the port 797 and line 798 (Fig. 33). Thus, unless the blank has been properly positioned on the work spindle and the transfer arm 527 swung clear of the work spindle, the motive fluid cannot flow to the safety valve and consequently the motive fluid cannot flow to the chamber 228 of the auxiliary reverse valve 216 (Fig. 14) so that, consequently, the motive fluid cannot flow into the cylinder 171 to move the main piston 170 and the work head back to cutting position. In other words, unless the new blank has been properly positioned on the work spindle and chucked and the transfer arm 527 swung clear of the work spindle, the safety valve will prevent the work head from returning into the cut. Thus, the safety valve acts to prevent damage to the machine in case of faulty operation of the loading mechanism for any reason.

It is to be noted, further, that the safety valve and the line 854 are only open to supply during the period that the transfer arm 527 is moving up to the magazine after it has been swung into alignment with the magazine pocket 507. As soon as the transfer arm 527 has moved into the position shown in Figure 28, the safety valve 507 will be forced back into the position shown in Figure 41, shutting off the supply to the line 854. This is the position which the safety valve occupies during the succeeding operations of cutting the new blank.

With the safety valve in the position shown in Figure 41, the fluid exhausts from this valve through the port 860 which communicates with a duct 861. The fluid flows from this duct 861 into the housing 303 of the index mechanism, lubricating the index parts and returning to the sump.

As the work head moves back to its operating position through operation of the safety valve, as described, the throttle valve 247 (Figs. 20 to 22) is forced downward by the double-track cam 281 against the resistance of the spring 272. Thus the valve 247 shuts off the port 605 (Figs. 15 and 20 to 22 inclusive) from supply from the port 650 which communicates with the main supply duct 225. This stops the supply of motive fluid through the line 602 to the chamber 608 of the transposing valve 600 (Fig. 53). The transposing valve 600 now returns to the position shown in Figure 53 under actuation of the spring 601. This shuts off all the ports leading from the transposing valve. Hence, the loading mechanism is rendered inoperative because fluid cannot be supplied to it from the transposing valve and because the ball-check valve 615 (Fig. 56) operates to prevent supply of the motive fluid to the pistons 621 and 620 (Figs. 32, 33 and 57) from the index cylinder 323, this ball valve shutting off the lines 622 and 625 from the line 617 (Figs. 54 to 57 inclusive), which line leads from the index cylinder 323. In the succeeding operation of the work head, after the first tooth space has been cut in the new blank and when the work head is withdrawn to index the new blank for the first time, the piston 322 is reversed in the cylinder 323 (Fig. 54) through operation of the index control valve as already described. This puts the line 880 which leads from the needle valve 658 (Figs. 33, 34 and 55) on supply through the port 881 in the cylinder 323 which communicates with the duct 363 (Fig. 54) in the wall of this cylinder. The pressure fluid thus flows through the chamber of the needle valve 658 into the line 657 (Figs. 33 and 57) to the upper and lower ends, respectively, of the pistons 621 and 620, respectively. Thus, the pistons are returned to the position shown in Figure 33, rotating the loader valve 632 backward a complete revolution to return it to starting position. As these pistons 621 and 620 move downwardly and upwardly, respectively, the exhaust fluid flows back through the lines 655, 622 (Fig. 57), the check valve 615 (Fig. 56), the duct 617 into that end of the cylinder 323 (Fig. 54) which is on exhaust. Thus, the loading valve is reset.

The work head continues its alternate feeding and indexing operations, under actuation of the mechanism as above described and when the last tooth is cut in the new blank, it is moved to loading position, the loading mechanism put into operation and a blank cut, all as already described.

As the completed gears are ejected from the several work spindles, they are deflected by the guards 900, one of which is secured to each work head, into a chute 901 (Figs. 2, 3, 5 and 6) which is formed in the casting in which the cutter spindle 101 is journaled. The chips and cutting coolant are also deflected by the guards 900 into this chute 901. At the bottom of the chute there is a pan 905 (Figures 4, 6 and 7). The chips, coolant and gears drop from the chute 901 onto the grid 906 which is hinged at 907 to the back wall of this pan 905. The chips and coolant pass through the grid but the gears remain on it. A triangular plate 908 is clipped to the grid to prevent any of the gears dropping into the bottom of the pan. The chips settle in the bottom of the pan. The coolant flows under the baffle plates 910 which are secured to the side walls of the pan 905 (Figs. 6 and 7) through the openings 911 provided in the side walls of the pan into the ducts 912 by which the coolant is returned to the sump or reservoir 913 in the base of the machine ready for use again.

The chips can be raked out of the pan 905 by lifting up the grid 906. Through the arrangement described, a very simple means is provided for separating gears from chips and coolant and coolant from chips.

It may be oftentimes desirable to withdraw a work head from operative position before the gear has been completely cut, as for the purpose of examining the partially cut blank. In such a case, it is desirable to avoid tripping the control mechanism housed in the control box 195 (Figs. 12 and 13) for if this mechanism is tripped, one less than the desired number of tooth spaces will be cut in the blank. The work head can be withdrawn without tripping this control mechanism by the manually operated means now to be described.

925 designates a hand lever (Figs. 2, 20 and 23) that is secured to a shaft 926 which is journaled in a bracket 927 which is secured by means of screws 928 to the casting 208. Pivotally connected to the lever 925 at its upper end, as at 930 is a link 931. This link 931 is pivotally connected as at 932 with a link 933. This link 933 is secured on a rock shaft that is journaled in the bracket 415. Secured to the rock shaft is a dog 935. This dog 935 engages a stud 936 that is secured in a collar 937. The collar 937 is secured to the rod or shaft 417 by a set-screw 938.

Figure 23:
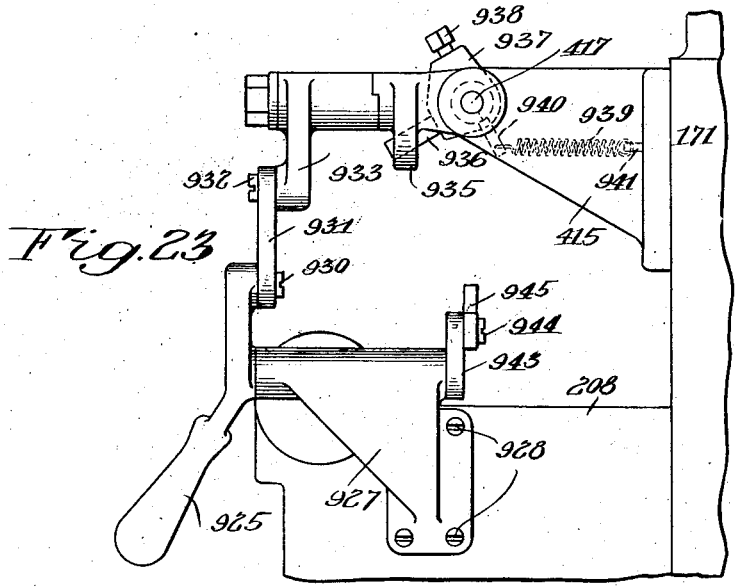
Figure 23 is an elevational view at right angles to Figure 20, showing further details of the manual trip lever.

The stud 936 is held in engagement with the dog 935 and the shaft 417 constrained into the position shown in Figures 20 and 23 by a coil spring 939 which is secured at one end to a pin 940 that is fastened to the collar 937 and which is secured at its opposite end to a pin 941 which is secured in the bracket 415. Thus, the shaft 417 is normally held in the position where the stop or trip 418 will engage the plunger 410 to operate the pawls 407 and 408 (Fig. 12) on each feed stroke of the work head and where the lug 454 will be in position to engage the link 450 (Fig. 12) to trip the pawls 407 and 408 out of engagement with the ratchet wheel 401, allowing the ratchet wheel to return to initial position, when the work head moves to loading position.

Secured to the shaft 926 at its rear end is a lever 943. This lever 943 is pivotally connected at 944 with a cam bar 945 (Figs. 19 and 27). This cam member 945 is connected by a screw 946 that passes through a slot 947 in the cam member with an arm 948, (Figs. 19, 27 and 13). The arm 948 is secured to the stud 205 to which the trip 204 (Fig. 18) is secured. This trip 204, as above described, trips the auxiliary reverse valve 216, governing the direction of movement of the main piston and of the work head.

The cam surface of the cam member 945 is adapted to engage a dog 949 (Figures 17 and 19) which is secured to the shaft 198. This shaft 198, as already described, is journaled in the control box 195 and carries the dogs 200 and 330 (Figs. 19, 12 and 13) which trip, respectively, the auxiliary reverse valve and the index control valve.

When the lever 925 is rocked downwardly from the position shown in Figure 20, the cam 945 will be moved to the left from the position shown in Figure 27, bringing its cam surface into engagement with the dog 949 and rocking the arm 948. Thus, the shaft 198 will be rocked to lift the dogs 200 and 330 out of alignment with the trips 204 (Fig. 18) and 334 (Fig. 12), respectively. At the same time, through the rotation of the arm 948, the trip 204 will be reversed to reverse the valve 216 (Fig. 18) which controls the direction of movement of the main piston. The slot 947 is provided in the cam 945 to insure that the cam contacts and lifts the dog 949 before it can contact the trip 204 which is reversed by this same movement of the cam 945.

At the same time that this is happening, through movement of the link 931, the link 933, and the dog 935, the rod 417 is rocked upwardly lifting the trips 418 and 454 out of alignment with the plunger 410 and the link 450 (Fig. 12), respectively. Thus, the work head can move full out without the control mechanism housed in the box 195 being tripped.

When it is desired to return the work head to operating position, the lever 925 is rocked upward, moving the cam 945 out of contact with the dog 949 and reversing the trip 204. Thus the auxiliary valve 216 is reversed to return the work head into operative position. At the same time, the trips 418 and 454 return to operative position under actuation of the spring 939.

The three-way valve 721 (Figs. 2 and 57) is provided so that at any time, the chucking mechanism can be released without affecting the operation of the rest of the machine. In normal position, this valve permits connection of the line 724 leading from the port 726 (Figs. 52) in the casing of the loader valve with the line 720 which leads into the chamber in which the piston 714 (Fig. 35) is housed. By rotating the valve 721 by a wrench or by any other suitable means, however, the line 720 can be connected with the line 360 (Figs. 2 and 54) which leads into the index cylinder 323. Thus, the motive fluid which flows into the index cylinder can be used to move the piston 714 (Fig. 35) and release the chucking mechanism whenever desired.

The operation of the machine will be apparent from the preceding description but may be summed up here. Each of the work head carriers 136 is adjusted with reference to its operating slide 155 according to the depth of tooth which it is desired to cut. Each of the work heads 137 is adjusted angularly on the corresponding work head carrier 136 according to the root angle of the several blanks to be cut. Nose-pieces 152 (Figs. 35 and 36) are chosen for each of the work spindles corresponding to the cone distances of the several blanks to be cut. Proper index plates 300 are selected for each work head. It is to be noted that each of the work heads is entirely independent in its operation of any other work head, so that four blanks of different numbers of teeth might be cut simultaneously on the four work heads. Thus, the cutting, indexing and loading operations proceed in the case of each work head entirely independent of the same operation on the other heads, so one or more of the heads might be stopped entirely and the work proceed on the other heads. In Figure 1, three of the heads are shown in operative position and one of the heads withdrawn for loading.

Before each work unit is put into operation, the control box 195 (Fig. 12) is adjusted on the plate 188 to adjust the stop 200 with reference to the stop 203 (Fig. 18) to determine the length of stroke of the corresponding work head during the alternate feeding and withdrawal movements.

With the various adjustments made, the machine may be put into operation. The cutter 102 (Fig. 5) rotates continuously during the operation of the machine, being driven from the motor 104 through the gearing shown in Figures 4 and 5.

The motor 104 drives the gear pump 125 (Figs. 4 and 57) which pumps the motive fluid from the sump through the line 950 which delivers it into the pressure stabilizing chamber 951 from which it flows through the four pipes 952 to the four work units of the machine. A by-pass is provided from the line 950 through a pressure relief valve 955 back to the sump. A check valve 956 is provided in the line 957 leading from the sump to the pump 125 to prevent back flow of the fluid. A stop-cock 958 is provided in each of the lines 952 so that any one or more of these can be shut off if desired without interfering with the operation of the other work units. Air is entrapped under pressure in the pressure stabilizing chamber 950. This acts to maintain a substantially constant pressure on the motive fluid despite the variations in the volume of fluid required at different times for the different operations of the machine.

The pressure fluid flows through the line 959 into the bore 225 (Fig. 15) whence it is delivered by the ducts 260 and 227 (Figs. 18 and 57) into the chamber 228 of the auxilary reverse valve 216. Through the ports 232 and 268, the pressure fluid also flows into the chamber of main reverse valve 215. The auxiliary valve is connected by the ducts 261 and 229, also, with the chamber of the main reverse valve 215. The main reversing valve 215 is connected by the lines 234 and 238 (Figs. 2 and 57) with the opposite ends of the main cylinder 171. Exhaust returns from the reverse valve 215 through the duct 244 (Fig. 15) and the throttle valve 247 to the sump.

As the main piston 170 moves back and forth in the cylinder 171, it reverses the trip 204 at opposite ends of its stroke. Thus, the auxiliary valve 216 is shifted back and forth, shifting the main valve 215 back and forth and reversing the piston 170 itself.

As the piston 170 moves back and forth, it rocks the crank 175 through the geared connection 172, 174 (Figs. 8 and 9) moving the operating slide 155 back and forth. This slide 155 is connected through a pin and block connection with the work head, so that as the piston 170 moves back and forth in the cylinder 171, the work head is moved alternately toward and away from the cutter to feed the blank into the cutter to cut a space in the blank and withdraw it to permit indexing. The positions of the parts during cutting and when withdrawn are shown in Figures 8 and 9, respectively. The limits of the feed and withdrawal motions are determined by the setting of the stops 200 and 203 as already described.

The speed of movement of the work head into the cut and during its withdrawal motion is determined by the contour of the cam 281 (Figs. 20, 21 and 57). This cam controls the position of the throttle valve 247 which in turn controls the flow of the exhaust fluid through the line 244 (Figs. 15 and 57) back to the sump. In the feed movement of the work head, the flow of the exhaust is throttled by contact of the tip of the part 290 (Fig. 20) with the portion $x$ of the cam 281, while on the reverse movement of the work head, when it is moving to indexing position, the throttle valve is opened to permit this movement to occur at full speed because the ears 288 of the valve are now contacting with the cam surface 286 of the cam 281, as shown in Figure 21.

As the main piston 170 moves back and forth, as described, the index control valve 341 is shifted back and forth alternately by the trip dogs 330 and 333 (Figs 12 and 57). The tripping of the index valve 341 back and forth moves the index piston 322 back and forth (Fig. 54) to alternately index the blank and lock the work spindle up again. The tripping of the index mechanism is so timed that the work spindle is indexed while the work head is withdrawn and locked up again before it has returned into cutting position for the cutting of the next tooth space in the blank.

Each time that the work head moves into the cut, the plunger 410 (Figs. 12, 20 and 57) strikes the trip 418 causing the pawls 407 and 408 to move the ratchet wheel 401 a tooth. When the last tooth is cut, the dog 429 which is secured to the same shaft as the ratchet wheel 401 strikes the lug 438 on the shaft 198 (Figs. 12, 13 and 19). This rocks the trips 200 and 330 out of line with the trips 204 and 334, respectively (Figures 12, 18 and 57). This is because the lug 439 is secured to the shaft 198 to which the trips 200 and 330 are secured.

Thus, the index control valve 341 and the auxiliary valve 216 are not reversed on the next outward movement of the work head, so that the work head moves full out until the piston 170 bottoms in the cylinder 171. By setting the ratchet wheel 401 and with it the dog 429, through the dial 435 (Fig. 13), the control mechanism can be adjusted to permit cutting any desired number of teeth in the blank before allowing the work head to move to loading position.

As the work head moves out to loading position, the throttle valve 247 rises under actuation of the spring 272, following the surface of the cam 281. In the position shown in Figure 22, the throttle valve 247 is opened to permit the motive fluid to flow through the port 605 and the line 602 (Fig. 53) into the chamber of the transposing valve 600 (Figs. 53 and 57). This valve has been in the position shown in the figures just referred to during cutting. As the pressure fluid flows into the chamber 608, it forces the transposing valve open against the resistance of the spring 601. When the work head moves out, the work spindle remains locked up with the piston 322 in the position shown in Figure 54. With the transposing valve 600 open, the pressure fluid flows from the cylinder 323 through the line 617, the pipe 609 (Figs. 54, 55 and 53) into the chamber 608, thence through the lines 622 and 655 to the opposite ends of the pistons 621 and 620 (Figs. 32 and 33).

At the same time, the pressure fluid flows from the chamber 608 (Fig. 53), through the line 635 to the duct 636 (Fig. 47) into the casing 633 which houses the loading valve 632.

The cylinder 621 moves up and the cylinder 620 down (Fig. 33) under actuation of the motive fluid. Through the racks 626 and 625 cut into the pistons and which mesh with the pinion 629, these pistons rotate the loading valve 632. In one revolution of the loading valve, the various chucking and loading operations take place.

First, the chucking mechanism is released by a flow of the pressure fluid through the port 726 (Fig. 52) and the lines 724 and 720 (Figs. 2, 35 and 57) into the chamber 710. This forces the piston 714 upwardly rocking the mushroom-headed member 702 out of alignment with the draw bar 145 and forcing the tapered expander forward against the resistance of the spring 150. Next, the transfer bar 525 moves outward carrying the transfer arm 527 away from the magazine (Figs. 28 to 32 inclusive). This movement is effected by supply of the fluid from the port 760 (Fig. 48) to the port 762 (Fig. 32) which moves the piston 765 to the right in the cylinder 764, rotating the pinion 770 and moving the bar 525 outwardly. In its outward movement, the transfer arm 527 carries with it the rod 571, allowing the block 503 to tip throwing the blank in the pocket 505 into the pocket 507 in the magazine. At the same time, as the transfer arm 527 moves outwardly, the completed gear is stripped from the work spindle by engagement of the catch 545 (Figs. 35 to 39 inclusive) with the stripper bar 582.

Next, the transfer arm 527 is swung down into alignment with the work spindle. This is accomplished by rotation of the bar 525 through movement of the piston 779 to the right in Figure 33. The piston 779 moves to the right through pressure fluid supplied from the port 775 (Fig. 51) to the port 780 (Fig. 32). In this rotational movement of the transfer arm, the stripper bar is released by passage of the catch 545 through the slot 590 in this bar. Immediately the stripper bar springs back to normal position under actuation of the spring 586. In this movement of the transfer arm 527, also, the arm 842 (Figs. 42 and 43) moves into alignment with the rod 843 (Figs. 40 and 41).

Next, the transfer arm 527 moves inwardly for in the further rotation of the loader valve 632, the port 766 is put on supply to supply the port 767 and move the piston 765 (Fig. 32) to the left, as shown. In this inward movement of the transfer arm 527, the new blank is positioned on the work spindle. If it goes on properly, the transfer bar 525 can move inward to the limit of its movement, bringing the arm 842 (Figs. 43 and 42) into contact with the rod 843, tripping the catch 818 out of engagement with the bar 813 and releasing the safety valve 807. The valve 807 is now open to supply from the line 798, but this line is closed because the piston 779 is to the left from the position shown in Figure 33.

Next, the chuck release piston 714 (Fig. 35) is put on exhaust through the port 726 (Fig. 52). The chucking mechanism returns to chucking position under actuation of the spring 150, securing the new blank to the work spindle.

Next, the transfer bar 525 moves outwardly through supply of the motive fluid to the port 762 (Fig. 32) from the port 760 (Fig. 48).

Next, the transfer arm 527 is rotated into alignment with the pocket 507 in the magazine through supply of the motive fluid to the port 777 from the port 775 (Fig. 51). In this movement of the transfer arm, the stud 542 again engages the notch 572 (Figs. 28 and 29) in the rod 571. In this movement, also, the stud 540 engages and lifts up the arm 551, lifting up all except the lowermost blank in the magazine. In this same movement, the arm 842 (Figs. 42 and 43) is brought into alignment with the rod 815 but does not contact this rod. With the piston 779 (Figs. 32 and 33) moved to the left, the port 797 is opened and the motive fluid now flows through the line 798 into the chamber of the safety valve whence it now flows into the line 854 back to the auxiliary reverse valve 216 (Figs. 18 and 57), reversing this valve. This in turn reverses the main valve 215 which in turn reverses the main piston 170 and causes the work head to move back into operative position.

Next, the transfer arm 527 moves inwardly through supply of the motive fluid to the port 767 from the port 766 in the loader valve casing. In this inward movement, the rod 571 is carried inwardly rocking the block 503 against the resistance of the spring 568 so that the blank which has been riding on the periphery of this block drops into the pocket 505. In this same inward movement of the transfer arm 527, the gate members 509 are opened by the wedge member 538. Also, the collet 531 enters the bore of the blank G in the pocket 507. In the inward movement of the transfer arm 527, also, the arm 842 strikes the rod 815 (Figs. 40 to 43 inclusive) forcing the valve 807 inwardly against the resistance of the spring 808 until the catch 818 re-engages with the bar 813 locking this valve in the position in which it remains during the succeeding cutting operation on the new blank.

In the inward movement of the work head, the throttle valve 247 (Fig. 22) is forced down against the resistance of the spring 272 and the port 605 is closed. This shuts off the supply to the line 602 (Fig. 53). The transposing valve is again closed under actuation of the spring 601. This shuts off the various lines leading from the chamber 608 of this valve. After the first tooth space has been cut in the new blank and the work head withdrawn, in the succeeding indexing operation, the line 657 (Fig. 57) is opened to supply from the line 880 (Fig. 55) which communicates with the port 881 (Fig. 54). The motive fluid flows during the indexing period through the line 657 to the upper and lower ends of the pistons 621 and 620, respectively, returning these pistons to their starting positions and rotating the loading valve back to its starting position. This completes one cycle of operation of the machine.

Pivotally mounted on a pin 990 on the work head (Figs. 32 and 33) is a lever 991 operated by a handle 992. This lever can be rotated by hand to move its free end, which is beveled, under the sleeve 553 (Figs. 28 and 29) to lift the weight of the blanks off of the block 503 whenever desired for any reason.

While the invention has been described in connection with a particular embodiment and in connection with a particular use of that embodiment, it will be understood that there are many features of the invention which are capable of general use and that the invention is capable of further embodiments and modifications. In general, it is to be understood that this application is intended to cover any variations, uses, or adaptations of the invention following, in general, the principles of the invention and including such departures from the present disclosure as come within known or customary practice in the art to which it pertains and as may be applied to the essential features hereinbefore set forth and

Having thus described my invention, what I claim is:

1. In a machine for producing gears, a blank holder, a work spindle, and means for transferring a blank from said blank holder to the work spindle comprising a reciprocable and rotatable bar provided with a toothed rack section and with a toothed spur gear section, an arm secured to said bar having blank engaging means secured thereto, a piston provided with a series of rack teeth adapted to engage the spur toothed section of said bar, a second piston provided with a series of rack teeth, an idler gear meshing with said second piston and with the rack teeth of said bar, and means for actuating said pistons to effect the transfer movement.

2. In a gear cutting machine, a work spindle, a magazine adapted to carry a plurality of gear blanks, a transfer arm for transferring blanks from the magazine to the work spindle, separate fluid pressure operated means for reciprocating said arm and oscillating the same, and a rotary drum having a plurality of slots formed thereon and extending part-way around the periphery of the drum and located at different axial positions along the drum and serving, in the rotation of the drum, as valves governing the movement of the transfer arm.

3. In a gear cutting machine, a work spindle, chucking mechanism for securing a work piece to the spindle, a magazine adapted to carry a plurality of gear blanks, a transfer arm for transferring a gear blank from the magazine to the work spindle, fluid pressure operated means controlling the operation of the chucking mechanism, fluid pressure operated means controlling the transfer movement of the transfer arm, and a rotary drum having a plurality of slots formed thereon and extending part-way around the periphery of the drum and located at different axial positions along the drum and serving, in the rotation of the drum, as valves governing the operations of said two fluid-pressure actuated means.

4. In a gear cutting machine, a tool mechanism and a work spindle, one of which is movable away from the other to inoperative position for loading, a magazine adapted to carry a plurality of gear blanks, a transfer arm adapted to transfer a blank from the magazine to the work spindle, fluid pressure operated means for operating the transfer arm to load the work spindle after the movable part has been withdrawn, fluid pressure operated means for returning the movable part to operating position after the loading has been completed, and a series of valves cut into a single rotary drum controlling the timed relation of operation of said fluid pressure operated means, said drum being put into operation automatically on movement of the movable part to loading position.

5. In a gear cutting machine, a work spindle, a magazine adapted to carry a plurality of gear blanks, a transfer arm for transferring a blank from the magazine to the work spindle, and means actuated by movement of the transfer arm in its transfer movement for ejecting a previously cut blank from the work spindle.

6. In a gear cutting machine, a work spindle, a magazine adapted to carry a plurality of gear blanks stacked therein, a blank holder communicating with said magazine having a pocket formed therein to hold blanks in a position at right angles to the position they occupy when stacked in the magazine, a transfer arm adapted to engage a blank when positioned in said pocket, means for actuating said arm to cause it to engage a blank and transfer the blank from the blank holder to the work spindle, and means actuated by movement of the transfer arm in its transfer movement for locating the blanks in blank holder successively in position to be picked up by said transfer member in its successive blank-engaging movements.

7. In a gear cutting machine, a work spindle, a magazine adapted to carry a plurality of gear blanks in stacked relation, a transfer member adapted to be engaged with a blank when the blank is positioned at an angle to the position it occupies in the magazine, means for moving said member to engage the blanks and carry them successively from the magazine to the work spindle, an oscillatory member adapted on oscillation to move the endmost blank in the magazine into position where it can be picked up by said transfer member, and means whereby the movement of said transfer member in its successive loading movements operates said oscillatory member.

8. In a gear cutting machine, a work spindle, a magazine adapted to carry a plurality of gear blanks stacked on one another, a transfer member for moving the blanks successively from the magazine to the work spindle, an oscillatory block extending beneath the successively lowermost blank in the magazine and adapted to be rocked to swing said blank from horizontal to vertical position where it can be picked up by the transfer member, means adapted to be operated by the transfer member in the successive cycles of its loading movement to operate said oscillatory member, and means operated by said transfer member for taking the weight of said stack of blanks off said oscillatory member when the same is being rocked.

9. In a gear cutting machine, a work support, a tool mechanism, a work spindle journaled in the work support, an index plate connected to the work spindle, a locking dog adapted to engage the indexing plate, an arm rotatably mounted on the work spindle, means carried on the arm adapted on rotation thereof in one direction to disengage said locking dog from said index plate, means carried by the arm adapted thereafter to connect the work spindle with said arm for rotation together, and fluid pressure operated means for rotating said arm.

10. In a gear cutting machine, a work spindle, and a tool mechanism, one of which is movable toward and from the other through a limited distance for feeding and indexing and which is movable away from the other an extended distance to permit loading, fluid pressure operated means for indexing said spindle, a magazine, fluid pressure operated means for transferring blanks from said magazine to the work spindle, and means for connecting said last named means with the index mechanism when the movable part is moved to loading position to permit flow of the pressure fluid through said index mechanism to said loader operating mechanism to actuate the latter.

11. In a gear cutting machine, the combination with a tool mechanism and a work spindle, one of which is movable toward and from the other through a limited distance for feeding and indexing and is movable an extended distance away from the other to permit loading, and fluid pressure operated mechanism for producing said movements, of a magazine, a transfer member for transferring blanks from the magazine to the work spindle when the movable part is at the loading position, fluid pressure operated means including a piston for actuating said transfer arm, a fluid supply line connecting the cylinder in which said piston moves with the fluid pressure operated means for actuating said movable part, said line being opened by said piston when under its actuation the transfer member has performed its function and is clear of the blank to permit flow of the pressure fluid to said actuating mechanism to return said movable part to cutting position.

12. In a gear cutting machine, the combination with a tool mechanism and a work spindle, one of which is movable toward and from the other through a limited distance for feeding and indexing and is movable an extended distance away from the other to permit loading, and fluid pressure operated means for producing said movement, of a magazine adapted to carry a plurality of blanks, a transfer member for transferring a blank from the magazine to the work spindle when the movable part is at loading position, means preventing return of the movable part into operative position if the new blank has not been positioned correctly on the work spindle, said means being released by the transfer member itself when it functions properly, and means whereby the transfer member in its complete cycle opens up a line supplying pressure fluid to the means for moving said first named movable part to permit return of said part to operative position when the locking means has been released.

13. In a gear cutting machine, a tool support and a work support, one of which is movable an extended distance away from the other to permit loading, a magazine, a transfer member for transferring blanks from the magazine to the work spindle when the movable part is at loading position but inoperative when said part is in cutting position, fluid pressure operated means for actuating said movable part and a valve controlling the speed of movement of said movable part adapted to be opened full when the movable member moves to loading position to cause said movement to occur at full speed and to release said transfer member for operation.

14. In a gear cutting machine, a tool support and a work support, one of which is movable away from the other to permit loading, a work spindle journaled in the work support, chucking mechanism for securing a work piece to the work spindle, means for releasing the chucking mechanism, fluid-pressure operated means for actuating said movable part, a valve controlling the speed of movement of the movable part adapted to be opened full when the movable part is moving to loading position to cause said movement to occur at high speed and to permit actuation of said chuck release.

15. In a gear cutting machine, a tool support and a work spindle, one of which is movable toward and from the other through a limited distance for feeding and indexing and is movable away from the other an extended distance to permit loading, a control device adapted to be adjusted to permit a predetermined variable number of feeding and indexing movements and then allow complete withdrawal, and means for resetting said control device when said part is moving away to loading position.

16. In a gear cutting machine, a tool support and a work spindle one of which is movable toward and from the other through a limited distance for feeding and indexing and is movable away from the other an extended distance to permit loading, a control device adapted to be adjusted to permit a predetermined variable number of feeding and indexing movements and then allow complete withdrawal, and manually operated means for moving said movable part to loading position without actuation of said control device.

17. In a gear cutting machine, a tool mechanism and a work spindle, means for supplying a coolant at the point of cut, means for ejecting a completed gear from the work spindle, a chute into which the coolant, chips and gears fall, and means connected with the chute for separating the gears, coolant and chips from each other.

18. In a gear cutting machine, a work support, and a tool mechanism, fluid pressure operated means including a piston connected to one of said parts for moving said part alternately toward and from the other part for feeding and indexing, means for indexing the work spindle when said movable part is in withdrawn position, and means carried by said piston governing the direction and speed of its movement and the operation of said indexing mechanism.

19. In a machine of the class described, a blank holder, a work support, means for transferring a blank from the blank holder to the work support while the work support is in loading position comprising an arm, a collapsible collet carried by said arm and adapted to releasably grip a gear blank, means carried by said arm constantly urging said collet into gripping position, means for releasing said collet when the blank has been carried to the work support and means for moving said arm to move the collet to the work support and back again to cause the collet to transfer a blank from the blank holder to the work support and return to grip a new blank, and means for supplying blanks successively to the blank holder.

20. In a machine of the class described, a blank holder, a work support, means for transferring a blank from the blank holder to the work support when the work support is in loading position comprising an arm, a collapsible collet carried by said arm adapted, when expanded in the bore of a gear blank, to releasably grip the same, means carried by said arm constantly urging said collet into expanded position, means for collapsing said collet when a blank has been carried to the work support, means for moving said arm from the blank holder to the work support and back again to cause the gripping device to transfer a blank from said blank holder to the work support and return to grip a new blank, and means for supplying blanks successively to said blank holder.

21. In a machine of the class described, a blank holder adapted to hold one blank at a time, a container adapted to carry a plurality of blanks, a work support, transfer mechanism adapted to transfer a blank from the blank holder to the work support, and means operable on said transfer movement to cause a new blank to be transferred from said container to the blank holder.

22. In a machine of the class described, a blank holder adapted to hold one blank at a time, a container adapted to carry a plurality of blanks, a work support, a transfer arm, means carried by said arm adapted to releasably grip a gear blank, a movable member adapted to transfer blanks successively from said container to the blank holder, means operative when said transfer arm is moved to cause the gripping device to engage a blank in the blank holder to prevent actuation of the movable member and to return said movable member to inoperative position after it has been operated, means operative to move said member when the last named means is released by movement of the transfer arm away from the blank holder, and means for actuating the transfer arm to carry a blank from the blank holder to the work support.

23. In a machine of the class described, a work support, a blank holder, transfer mechanism operative, when the work support is in loading position, to transfer a blank from the blank holder to the work support and return to the blank holder to grip a new blank, means operated by the transfer mechanism in its movement after the blank has been transferred to the work support and the transfer mechanism has moved clear of the work support to cause said work support to return to operative position.

24. In a machine of the class described, a blank holder comprising a pocket open at one side and a movable door adapted to close said side to retain a blank in said pocket, a transfer arm having means thereon adapted to be moved into said pocket to grip a blank, and means carried by said arm adapted in said engaging movement to open said door ahead of the blank engaging means.

25. In a machine of the class described, a blank holder comprising a member open at one side and a pair of hinged doors for closing the open side of said member to form a pocket for holding a gear blank in position with its bore in registry with the side opening, means normally urging said doors into closed position, a transfer arm having means thereon adapted to enter the bore of a gear blank to releasably grip the same, means for moving said transfer arm to engage the gripping means with a blank carried in said pocket, and means on said arm adapted on said movement to first open said doors to allow the blank engaging means to enter said pocket.

26. In a machine of the class described, a work spindle, a blank holder adapted to contain gear blanks, means for stripping a gear from the work spindle after the operations thereon have been completed, means for transferring a new blank from the blank holder to the work spindle, and means adapted to be actuated during the transfer movement for actuating said stripping means.

27. In a machine of the class described, a work spindle, a blank holder adapted to carry gear blanks, means for stripping a gear from the work spindle after the operations thereon have been completed, a transfer arm for transferring blanks from the blank holder to the work spindle, said arm being movable outwardly from the blank holder in its transfer movement, and means connected to said arm adapted on the outward movement thereof to actuate said stripping means.

28. In a machine of the class described, a work spindle, means for detachably securing a gear blank to the work spindle, a blank holder, means for transferring blanks from the blank holder to the work spindle comprising a bar mounted in parallelism to the work spindle and slidable in the direction of and rotatable about its own axis, an arm carried by said bar having means thereon for detachably gripping a gear blank, a stripper slidably mounted on the bar and adapted to engage behind the blank secured on the work spindle, spring means constantly urging the stripper rearwardly to inoperative position, and a member carried by said bar adapted to be engaged behind said stripper on rearward sliding movement of said bar adapted to force said stripper forward on forward sliding movement of said bar to cause said stripper to strip the gear from said spindle.

29. In a machine for producing gears, a blank holder, a work spindle, means for effecting a cutting operation of the gear and then moving the work spindle to loading position, transfer mechanism for transferring a blank from the blank holder to the work spindle, and means operative on movement of the work spindle to loading position to release the gear carried by said spindle, strip the same from the spindle, actuate said transfer mechanism, chuck the new blank on the work spindle, and return the transfer mechanism to the blank holder and cause the same to pick up a new blank from the blank holder.

30. In a machine for producing gears, a work spindle, means for moving the work spindle to loading position after the operations on the work-piece carried thereby have been completed, a blank holder, transfer mechanism for transferring a blank from said holder to the work spindle, means operative when the work spindle is moved to loading position to release the work-piece carried by the spindle, strip the same from the spindle, actuate said transfer mechanism, chuck the new blank on the spindle, return the transfer mechanism to the blank holder and cause the same to pick up a new blank from the blank holder and then return the work spindle to operative position.

31. In a machine for producing gears, a pair of supports, one of which is movable toward and from the other, fluid-pressure operated means for effecting said movement, a slidable valve controlling the speed of said movement, spring means urging said valve in one direction, means governing the position of said valve comprising a pair of cams, a follower pivotally connected with said valve and adapted to contact with one of said cams, a second follower secured to said valve and adapted to engage the other cam, when the first follower is swung out of the way, to allow the valve to open further under actuation of the spring thereby to accelerate movement of the movable part, the cam engaged by the first follower being so formed that when reversal of movement takes place at the end of the movement in one direction, the first follower is rocked out of engagement with its cam.

32. In a machine of the class described, a pair of supports, one of which is a work support, fluid-pressure operated means for moving one of said supports toward the other to effect a working operation and for withdrawing said support away from the other when the working operation has been completed to permit removal of the completed work-piece and chucking of a new blank, fluid-pressure operated means for stripping the completed blank from the work support, and a single valve controlling the speed of operation of the first named means and the operation of the last named means.

33. In a machine of the class described, a pair of supports, one of which is a work support, fluid-pressure operated means for moving one of said supports toward the other to effect a working operation and for withdrawing said support away from the other when the operation has been completed to permit removal of the completed work-piece and chucking of a new blank, fluid-pressure operated means for releasing the chucking mechanism of the work support after the work-piece has been completed, and a single valve controlling the speed of operation of the first named means and the operation of the last named means.

34. In a machine of the class described, a pair of supports, one of which is a work support, fluid-pressure operated means for moving one of said supports toward the other to effect a working operation and for withdrawing said support away from the other after the working operation has been completed to permit removal of the completed work-piece and chucking of a new blank, a blank holder, fluid-pressure operated means for transferring a blank from said blank holder to the work support, and a single valve controlling the speed of operation of the first named means and the operation of the last named means.

35. In a machine of the class described, a pair of supports, one of which is a work support, fluid-pressure operated means for moving one of said supports toward the other to effect working operations and for withdrawing said support away from the other when the working operations have been completed to permit removal of the completed work-piece and chucking of a new blank, a blank holder, fluid-pressure operated transfer mechanism for transferring a blank from the blank holder to the work support, a rotary drum having a series of valves cut into its periphery controlling the sequence of operations of the transfer mechanism, a movable valve controlling the speed of operation of the movable support during its movement to and from working position and operable on movement of the movable support to loading position to permit supply of the pressure fluid to the parts of said transfer mechanism controlled by the valves of the rotary drum.

36. In a machine of the class described, a pair of supports, one of which is a work support, fluid-pressure operated means for moving one of said supports toward the other to effect a working operation and for withdrawing said support away from the other when the working operation has been completed to permit removal of the completed work-piece and chucking of a new blank, a blank holder, fluid-pressure operated transfer mechanism for transferring a blank from the blank holder to the work support, a rotary drum having a series of valves cut into its periphery controlling the sequence of operations of the loading mechanism, fluid-pressure operated means for rotating said drum, a movable valve controlling the speed of operation of the movable support during movement to and from working position and operable on movement of said support to loading position to permit supply of pressure fluid to the parts of the transfer mechanism controlled by said rotary drum and to the fluid-pressure operated means for rotating said drum.

37. In a machine of the class described, a pair of supports, one of which is a work support, fluid-pressure operated means for moving one of said supports toward the other to effect a working operation and for withdrawing said support away from the other when the working operation has been completed to permit removal of the completed work-piece and chucking of a new blank, a blank holder, fluid-pressure operated transfer mechanism for transferring a blank from the blank holder to the work support, means for releasing a work-piece from the work support, means for stripping a released work-piece from the work support, a rotary drum having a series of valves cut into its periphery controlling the sequence of operations of said releasing, stripping, and transfer mecshanisms, fluid-pressure operated means for rotating said drum, a movable valve controlling the speed of operation of the movable support during its movement to and from working position and operable on movement of said movable support to loading position to permit supply of pressure fluid to the fluid-pressure operated parts controlled by operation of said drum and to the fluid-pressure operated means for rotating said drum.

38. In a machine of the class described, a pair of supports, one of which is a work support, means for moving one of said supports toward the other to effect a working operation and for withdrawing said support away from the other to permit of removal of the completed work-piece and chucking of a new blank, a blank holder, a transfer arm for transferring blanks from the blank holder to the work support, separate fluid-pressure operated means for reciprocating and oscillating said arm to effect the transfer operation, a series of valves cut into a rotary drum for controlling the sequence of said transfer motions and means operable on movement of the movable support to loading position to actuate said drum.

39. In a machine of the class described, a pair of supports, one of which is a work support, means for moving one of said supports toward the other to effect a working operation and for withdrawing said support away from the other to permit removal of the completed work-piece and chucking of a new blank, chucking mechanism for securing a work-piece to the work support, a blank holder, transfer mechanism for transferring a blank from the blank holder to the work support, means for releasing the chucking mechanism, separate fluid-pressure operated means for actuating said chuck releasing mechanism and said transfer mechanism, a rotary drum having a series of valves cut therein for controlling the sequence of operation of the fluid-pressure operated means, and means operable on movement of the movable support to loading position to rotate said drum.

40. In a machine for producing gears, a tool support, a work spindle, means for indexing the work spindle comprising a notched index plate secured to the work spindle, a locking member adapted to engage successively the notches of said plate, an arm rotatable relative to the work spindle, means carried by said arm adapted to engage said locking member to disconnect the same from the index plate, means for connecting the work spindle to said arm when disengaged, and means for rotating said arm comprising a toothed segment secured to said arm, a rack member meshing with said segment, a piston secured to said rack member, and fluid-pressure operated means for reciprocating said piston.

41. In a gear cutting machine, the combination of a tool mechanism and a work support, one of which is movable toward and from the other for alternate feeding and withdrawal, and means for effecting said movement comprising a crank having a block and slot connection with said movable support through the crank-pin, a toothed segment secured to said crank, a rack meshing with said segment, a piston secured to said rack and movable in a direction at right angles to the direction of movement of the movable support, and fluid-pressure operated means for reciprocating said piston.

42. In a machine for producing gears, a work spindle, a magazine adapted to carry a plurality of gear blanks stacked therein, a blank holder communicating with said magazine and having a pocket formed therein to hold individual blanks in position for engagement by the transfer mechanism, transfer mechanism for transferring blanks successively from the blank holder to the work spindle, and means for separating the blanks in the magazine from the blanks in the blank holder, said means being connected to the transfer mechanism whereby on successive transfer movements, said last named means is operated to allow blanks to be moved successively from the magazine to the blank holder and be positioned therein.

43. In a machine for producing gears, a work spindle, a magazine adapted to carry a plurality of gear blanks in stacked relation, a transfer mechanism adapted to be operated to transfer blanks successively to the work spindle, a blank holder communicating with the magazine and adapted to hold blanks in position for engagement by the transfer mechanism, an oscillatory member adapted to separate the blanks in the magazine from the blanks in the blank holder, means whereby movement of the transfer member in its successive transfer movements operates said oscillatory member to allow the endmost blank in the magazine to be moved successively from the magazine to the work-holder and be positioned therein, and means for operating the transfer mechanism to effect transfer of blanks successively from the blank-holder to the work spindle.

44. In a machine for producing gears, a work spindle, a magazine adapted to carry a plurality of gear blanks in stacked relation, a transfer member adapted to be operated to transfer blanks to the work spindle, a blank-holder communicating with the magazine and adapted to hold blanks in position for engagement by the transfer member, an oscillatory member adapted to separate the blanks in the magazine from the blanks in the blank-holder, means whereby movement of the transfer member in successive transfer movements operates said oscillatory member to allow the endmost blanks in the magazine to be moved successively from the magazine to the work-holder and be positioned therein, means operated by the transfer member in its transfer movement for separating the remainder of blanks in the magazine from the endmost blank in the magazine at the time of the last described movement so as to allow the endmost blank to move into the blank-holder and means for operating the transfer mechanism to effect transfer of blanks from the blank-holder to the work spindle.

45. In a machine for producing gears, a work spindle, a magazine adapted to carry a plurality of gear blanks in stacked relation, a blank holder communicating with the magazine and adapted to hold individual blanks, a movable member operable to carry individual blanks successively from the magazine to the blank-holder, means for lifting the weight of the remainder of the blanks in the magazine off the endmost blanks therein to permit the endmost blanks to be transferred to the blank-holder on movement of said movable member, transfer mechanism for transferring blanks succesively from the blank-holder to the work spindle, means for actuating the same, and means actuated on movement of the transfer mechanism for actuating said movable member.

HERBERT J. WHITE.